(12) United States Patent
Dobbins

(10) Patent No.: US 8,321,584 B2
(45) Date of Patent: Nov. 27, 2012

(54) METHOD AND APPARATUS FOR OFFERING PREFERRED TRANSPORT WITHIN A BROADBAND SUBSCRIBER NETWORK

(75) Inventor: Kurt A. Dobbins, Bedford, NH (US)

(73) Assignee: Ellacoya Networks, Inc., Chelmsford, MA (US)

(*) Notice: Subject to any disclaimer, the term of this patent is extended or adjusted under 35 U.S.C. 154(b) by 876 days.

(21) Appl. No.: 10/673,157

(22) Filed: Sep. 30, 2003

(65) Prior Publication Data
US 2004/0199667 A1   Oct. 7, 2004

Related U.S. Application Data

(60) Provisional application No. 60/460,045, filed on Apr. 4, 2003, provisional application No. 60/460,046, filed on Apr. 4, 2003.

(51) Int. Cl.
*G06F 15/173* (2006.01)
(52) U.S. Cl. .................. 709/238; 709/206; 709/235
(58) Field of Classification Search .................. 709/232, 709/238, 224
See application file for complete search history.

(56) References Cited

U.S. PATENT DOCUMENTS

| | | | |
|---|---|---|---|
| 6,006,264 A | 12/1999 | Colby et al. | |
| 6,073,175 A | 6/2000 | Tavs et al. | |
| 6,363,429 B1* | 3/2002 | Ketcham .................. | 709/235 |
| 6,757,283 B1 | 6/2004 | Yamanaka et al. | |
| 6,760,769 B2* | 7/2004 | Jayam et al. ............... | 709/228 |
| 6,788,683 B1 | 9/2004 | Ikeda et al. | |
| 7,016,956 B2 | 3/2006 | Dobbins et al. | |
| 7,209,977 B2 | 4/2007 | Acharya et al. | |
| 2002/0002543 A1 | 1/2002 | Spooren et al. | |
| 2002/0029260 A1 | 3/2002 | Dobbins et al. | |
| 2002/0059120 A1 | 5/2002 | Milton | |
| 2002/0099842 A1 | 7/2002 | Jennings et al. | |
| 2003/0043802 A1 | 3/2003 | Yazaki et al. | |
| 2003/0084108 A1* | 5/2003 | Syed ........................... | 709/206 |
| 2003/0123393 A1* | 7/2003 | Feuerstraeter et al. ....... | 370/235 |
| 2003/0135863 A1* | 7/2003 | Van Der Schaar ............ | 725/95 |
| 2003/0174718 A1 | 9/2003 | Sampath et al. | |
| 2003/0200439 A1 | 10/2003 | Moskowitz | |
| 2005/0163073 A1* | 7/2005 | Heller et al. ................... | 370/328 |
| 2007/0079005 A1 | 4/2007 | Jasen et al. | |
| 2010/0132030 A1* | 5/2010 | Zuk ................................ | 726/13 |

OTHER PUBLICATIONS

"The E-Music Trap", Laura Rohde and Marc Ferranti, InfoWorld, Aug. 18, 2000.
Ethernet Autonegotiation Best Practices, Jim Eggers et al., Sun BluePrints OnLine—Jul. 2004.
Flynn, Roger R. Computer Sciences, Encyclopedia entry—"minitel" Macmillan Reference, 2002, pp. 142-145. "The French Videotex System Minitel: A Successful Implementation of a National Information Technology Infrastructure," Cats-Baril, William and Tawfik Jelassi, MIS Quarterly, Mar. 1994, pp. 1, 10, 11.
"FairShare anti-piracy", posting from Halfbakery.com.

* cited by examiner

*Primary Examiner* — Barbara Burgess
(74) *Attorney, Agent, or Firm* — Houston & Associates, LLP

(57) ABSTRACT

Methods and systems for identifying and preferring certain content transmissions over others for transport in a multiple subscriber computer network, such as public broadband access network. Preferred transport includes exempting participating content transmissions from bandwidth preservation policies, such as byte capping or rate limiting, or permitting the broadband access network provider to bill for certain identified content transmissions. The participating content transmissions are identified on a number of bases including by sending or receiving application, or by use of tags embedded by the content originator, sender or distributor. Those tagging techniques are also usable to enforce the content owner's distribution rights.

41 Claims, 34 Drawing Sheets

Figure 17

| 1 2 3 4 5 6 7 8 | 9 10 11 | 12 13 14 15 16 | 17 18 19 20 | 21 22 23 24 25 | 26 27 28 29 30 31 32 |
|---|---|---|---|---|---|
| Tag Identifier 170 | Tag Length 172 | Tag Version 174 | Reserved | Transport Service | Authenticated Transport | Reserved |
| Content Class/Type Encoded OID ||||||
| Content Application Encoded OID ||||||
| Content Originator Encoded OID ||||||
| Content Meta Data Encoded OID ||||||
| Authentication URL ||||||

Figure 18

| Field | Length (bytes) | Description | Comments |
|---|---|---|---|
| Tag ID 180 | 4 | Well-known tag identifier. Allows different tag types to be supported | Value set to "AUTH" |
| Tag Length 182 | 4 | Indicates the remaining length of the tag. | Maximum Length of 128 bytes |
| Tag Version 184 | 4 | Version of Tag Structure | Value set to "1.0" |
| Reserved | 4 | Reserved for Future Use | Unused |
| Transport Service 186 | 4 | Preferred Transport Bit Mask for Transport Service Preference. | 1 = No Rate Limit  2 = No Byte Cap  4 = On-Demand BW  8 = BLOCK ACCESS |
| Authenticated Transport 188 | 4 | Digital Signature used to authenticate preferred transport | |
| Reserved | 8 | Reserved for Future Use | Unused |
| Content Class/Type 190 | 16 | OID syntax from Content Class naming tree. | Encoded using ASN.1 BER {tag/len/value} |
| Content Application 192 | 16 | OID syntax from Application naming tree. | Encoded using ASN.1 BER {tag/len/value} |
| Content Originator 194 | 16 | OID syntax from Content Originator naming tree. | Encoded using ASN.1 BER {tag/len/value} |
| Content Meta Data 196 | 16 | OID syntax from Content Meta Data naming tree. | Encoded using ASN.1 BER {tag/len/value} |
| Authentication URL 198 | 32 | URL of authentication server | |

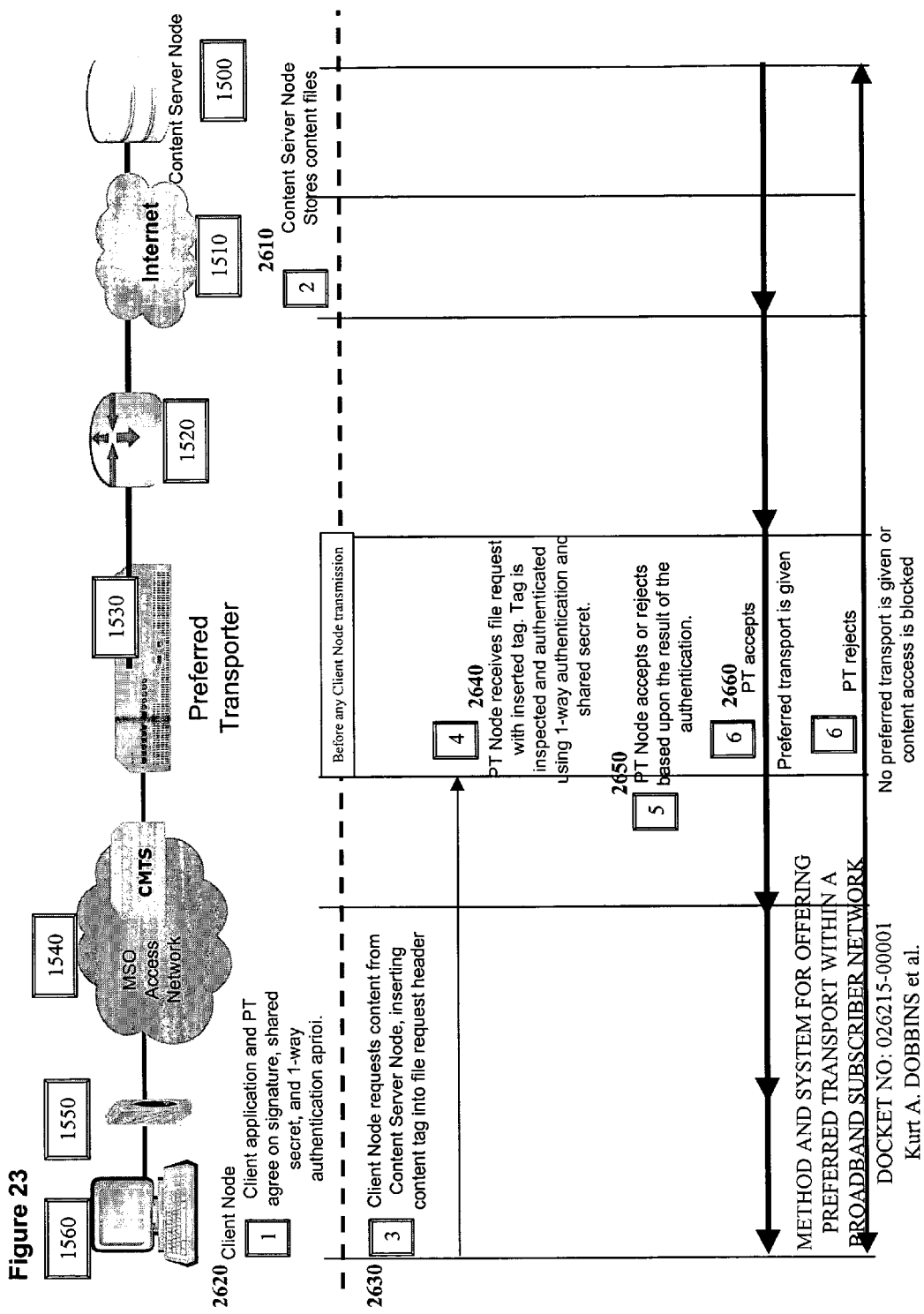

- Leverage OID Tree for Self-naming Tags
  - Gives digital representation to textual names
  - Allows arbitrary hierarchy
  - Extensible with new content types
  - Packet encoding will use ASN.1 BER
- Name Space Maintained by host
  - Publish as Informational IETF MIB

METHOD AND APPARATUS FOR OFFERING PREFERRED TRANSPORT WITHIN A BROADBAND SUBSCRIBER NETWORK

This application claims priority from U.S. Provisional Patent Application Ser. No. 60/460,045 of Kurt A. DOBBINS et al., filed Apr. 4, 2003, titled METHOD AND APPARATUS FOR OFFERING TAGGED CONTENT PREFERRED TRANSPORT WITHIN A BROADBAND SUBSCRIBER NETWORK; and U.S. Provisional Patent Application Ser. No. 60/460,046 of Kurt A. DOBBINS et al., filed Apr. 4, 2003, titled METHOD AND APPARATUS FOR CHARGING AND AGGREGATING ONLINE TRANSACTIONS THROUGH BROADBAND CARRIER BILLS. The entireties of those provisional applications are incorporated herein by reference.

BACKGROUND

1. Field of the Invention

The present invention relates to methods and apparatuses for identifying and affording special treatment for certain transmissions to a subscriber network access facility, and more particularly to tagging and authentication methods of reliably and efficiently marking and identifying transmissions of certain identified content, or transmissions from certain identified transmission nodes from outside or inside a network access facility such as a broadband subscriber network.

2. Description of Related Art

Traditional "circuit-switched" telecommunications networks—such as those typically employed by local and interexchange telephone or telegraph carriage—promoted the proper quality of service and preferential treatment for various types of network traffic by dedicating an entire electronic circuit on a full-time basis to each communications session. This enabled telecommunications providers to sell carriage on a reliable basis, but it was substantially inefficient, since for most of the time even while switched, each such circuit laid idle. Today's Internet, and more broadly speaking today's digital telecommunications networks have addressed that inefficiency by widespread use of a technique called "packet switching" using protocols such as the "Internet protocol" or IP amongst others. At the source, an originator of a transmission over a packet switched network divides the message into standard, evenly-sized packets, each of which is labeled as to source and destination in the network. Typically, each such packet bears no other identifiable marker as to the nature of its contents. Each node that receives such a packet during its transmission over the network reads the source and destination label, and switches that packet to next node on the network more proximate to the destination.

The advantages of packet switching techniques are well-known in the art and are manifold. In fact, packet switching is widely credited with offering the explosive proliferation of telecommunications that we are witnessing today not only in Internet, but in mobile telephony, long distance and digital television to name a few.

However, the fact that the packets are anonymous, and the transmission facilities of the network are not informed as to the nature of their contents raises some common difficulties. For example, certain types of content being transmitted require differentiated types of service over a telecommunications network. Voice or video communications require substantially consistent interconnection speeds and low latency, whereas data downloads may be better suited for burst transmission and long latency. Moreover, the proprietors of certain transmission nodes in a publicly accessible network may have a variety of business or functional reasons to treat various types or classes of content transmissions differently. For example, a 911 call over an IP network would require different service than a directory or residential call. Likewise, a medical image file may require different carriage treatment than free downloads of a movie file even though the file extensions and sizes may be equivalent.

This problem until now has been inherent in packet-switch networking. Efforts to date at solving this problem have been of limited reliability or utility. Communicating a meaningful element of content over an IP network has thus far involved the separate transmission of many individual packets. Prior art packet-by-packet analysis devices lack the ability to identify those meaningful groupings, and to transport all of those packets appropriately. The prior art techniques cannot ensure perfect designation of flows of information or detection of content types or classes. Yet broadband subscriber networks increasingly encounter the need to differentiate transport on a subscriber, content or application-specific basis. (Those networks include, for example, multiple service operators (MSOs) offering Internet access to subscribers over television cables, or Digital Subscriber Line ("DSL") providers such as local telephone companies.)

The advent and widespread popularity of peer-to-peer distribution networks has had a deleterious effect on broadband access providers' ability to provide uniform and high quality Internet access service to their subscribers. To be sure, widespread use of P2P networks has proliferated piracy of copyrighted music and video. Still, P2P networks provide users with important utility. One object of the present invention is to alleviate the negative impact of peer-to-peer networks by deploying inline systems such as preferred transporters that are able to recognize peer-to-peer traffic based on application or content tags and to treat that traffic according to policies that protect desired business or legal interests.

One impracticality of distributing very large files by a content-server to client architecture is that an inordinate amount of storage and connectivity is needed at the content server to enable public users to access common large sized files for download over the Internet. In addition, high-speed public Internet circuits are costly and low-speed Internet circuits may not provide adequate bandwidth and speed for content distribution. In such peer to peer networks, the task of storing and forwarding popular files is distributed to a point where the actual consumer client devices store and forward those files to each other. This reduces and distributes the cost of proliferating those very large files over a wide area network such as the Internet. Yet, in the current state of the art peer to peer distribution schemes, the content originator looses control over the transport and distribution of the original content, since it is served and distributed by multiple nodes within the peer network. It is therefore an object of the present invention to provide a system that enables a content originator to maintain control over the transport and distribution of content, even as the content is offered on peer to peer networks.

At the same time, peer to peer networks increases the demand for transmission capacity, especially upstream transmission capacity, among subscribers to broadband access networks. That demand at times exceeds those networks' ability to provide connectivity, and nearly always exceeds the amount of upstream capacity provisioned at those networks. One known solution for the broadband access providers is to passively identify P2P traffic and rate limit it. Another solution is to subject subscribers to periodic byte caps, especially to limit the amount of data they are permitted to upload.

However, there is a need for a system that allows broadband access providers more direct control over the transmission of content on a broadband access network.

In addition, these available peer-to-peer programs, which spread the costs of content distribution by using clients' networked computers as content servers, are wreaking havoc on broadband subscriber networks. Those networks were designed for a substantial amount of downtime at each client, and assuming that clients browsing the web and downloading a page would demand far less uploading bandwidth and payload on the network than downloading bandwidth and payload. Often, those peer-to-peer programs become havens for the distribution of pirated or other illegal material. Increasingly, legislative efforts and law enforcement are focusing on stopping that illegal conduct at the broadband subscriber network level.

Furthermore, applications can use techniques known as port-hopping and port-spoofing to mask the origination point of a transmission. In the IP communications art, destination nodes can recognize and route transmissions sent by certain applications through certain communications ports according to generally recognized port number assignments set by central authorities like the Internet Assigned Numbers Authority ("IANA"). But those ports are either assigned by IANA, or are assigned defacto (an applications start using them—this is known as "well known ports"). IANA designates a reserved set of ports for well-known applications. IANA also establishes a set of unreserved well known ports that are available for new applications to use on a de facto basis.

Whether reserved, assigned, or defacto—there is no known or generally recognized authentication or security scheme in place to ensure that only proper applications gain access to their proper communications ports at IP destination nodes. So whenever an application requests use of a certain port in IP communications, in the current state of the art, there is no way for the destination node to ensure that the communication actually was initiated by that application. In fact, spoofing the generally accepted port selection system is a simple affair, used by unrecognized applications to gain entry or carriage into IP routing systems.

One well-known technique incorporated into certain unfavored Internet client applications is known as "port hopping." Applications using this technique will distribute their content transmissions or requests on a random, pseudorandom, or programmed pattern among a variety of reserved or well-known communications ports. This allows unfavored applications to escape easy detection, and to usurp ports left open by IP destination nodes for necessary or favored applications.

In networks that are not public packet switched networks, such as cable television or telephone, the business of telecommunications carriage is enabled by bundling content or applications with network access. Contrast the sustained and successful business model of the traditional television industry with the commoditization of the Internet access industry. Broadcast, and even cable, television operations are supported largely by (i) advertisers paying for the privilege of having their content carried on public networks by the operators of that network; and (ii) more importantly by subscribers paying for content by channel bundles, pay per view, or other content transmission specific services. But such a model is not available to Internet access providers, who until now have been unable to monitor or control the content or applications made available to their own subscribers.

There is a need in the art for a method of positively identifying information transmitted to network access points such as broadband subscriber networks. The information could be identified by at least one of client application, content origin, type or class. Such an identification scheme could be known only by certain access points, or standardized for recognition by all nodes and content servers. Various levels of secure authentication could be used, including without limitation a shared secret, one-way encryption tags, or private-public key exchange. Such a method would enable any owned network resource, whether a switch, router, communications port, or even a given subscriber or subscriber group to require authentication. The scheme for identifying content could be extensible and predictable employing for example, hierarchical naming trees.

SUMMARY OF THE INVENTION

In one aspect, the invention relates to a method of offering preferred transport in a network. The method includes receiving a first part of a content transmission and receiving an indication of transport parameters, the indication being associated with the content transmission. The method further includes receiving a second part of the content transmission and transmitting the second part of the content transmission in accordance with the transport parameters.

In another aspect of the present invention, a transmission device includes a data receiver configured to receive a first part of a content and an indication of transport parameters associated with the content. The transmission device also includes a service logic for grouping the first part of the content and subsequent parts of the content as a communications flow and a transmission logic for determining the transmission parameters of the content according to the indication of transport parameters. The transmission device also includes a switching apparatus for transporting the first part and subsequent parts of the content to a communications port according to the communications flow determined by the service logic. The transmission device further includes a data transmitter configured to transmit the subsequent parts of the content in conjunction with the communications port in accordance with the transmission parameters determined by the transmission logic.

One advantage of the present invention is to alleviate the negative impact of peer-to-peer networks by deploying inline systems such as preferred transporters that are able to recognize peer-to-peer traffic based on application or content tags and to treat that traffic according to policies that protect desired business or legal interests. Another aim of the present invention is to offer affirmative authentication to truly favored applications to help ensure that only those applications gain access to their reserved communications ports.

BRIEF DESCRIPTION OF THE DRAWINGS

FIG. 17 illustrates the contents of an exemplary content authentication tag according to one aspect of the present invention.

FIG. 18 describes examples of possible fields for inclusion in a content authentication tag under the present invention.

FIG. 23 illustrates a communications and decision flow for authenticating a content transmission for preferred transport, wherein a preferred transporter identifies, interprets and executes instructions contained in a transmission request from a content receiver.

DETAILED DESCRIPTION OF THE INVENTION

Figure 1:
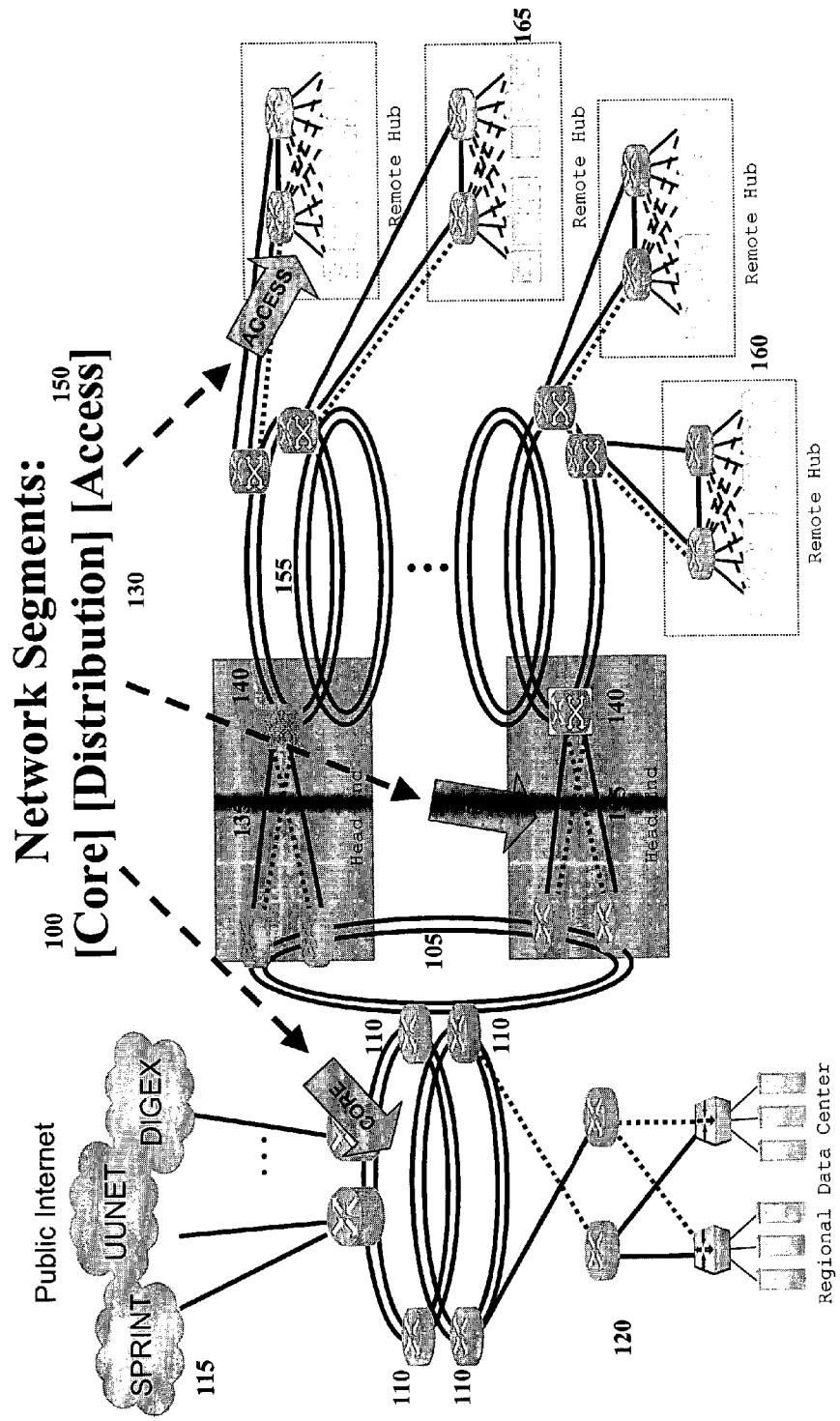
FIG. 1 illustrates the basic topology of a typical public broadband telecommunications network within which the present invention operates.

In one embodiment, the present invention provides a marking, also herein interchangeably referred to as a content tag, which is associated with content traveling across a network. The content tag provides information, for example, concerning the format, origin, client application, type, or class of the content.

In one embodiment, the present invention allows a network access operator—such as, for example, a DSL carrier, an MSO, an ISP, or WISP or any broadband or public or private network access provider—to verify, authenticate and offer differentiated service for content transmissions that are marked at an earlier point in distribution, for example, by associating them with a marking or content tag. That earlier point can be at the time of content creation, origination of transmission by a content server or peer client application, or at a midway transmission or distribution point. The marking or content tag can be associated with a piece of content regardless of the form of distribution or transmission that brings it to the network access operator to carriage to end users. Such a tag or another form of node or affirmative application signature can also be applied to transmissions on a "node specific" basis, i.e., at the point the transmission is originated, including among others by a content server, peer-to-peer client, supernode, or any other node that originates or carries the transmission through.

In one embodiment, the tags of the present invention are structured in a manner that is machine readable, and standardized for extensibility. Among others, a naming-tree method of structuring the lexicon for those tags is taught. In one embodiment, tags minimally include at least one designation of the nature of the content being transmitted. That at least one designation can include, by way of example, content type, content class, transport requirements, port designation, digital signature, payment information, content-carriage financial or business purpose designations, or other information.

One embodiment permits the access network operator to authenticate the tags prior to opening network access to the information flows that each such tag designates. That authentication can be accomplished, for example, in any number of "out of band" or real-time authentication techniques known in the art.

In embodiments of the present invention, transmission authentication may be achieved in any number of ways, including, but not limited to, the following:

(i) Out of band authentication can be performed by inspecting the contents of the tag for a secret shared by the network access operator on the one hand, and the entity requesting differentiated transport on the other. Then the preferred transport node (or another node to which the authentication task is outsourced) can decrypt any encrypted tag according to such a shared secret (or other means), by seeking authentication data buried within the tagged data and operating upon it according to any combination of shared secret numbers, shared secret formulas, shared secret algorithms or other shared secret information decrypted from the tag, or shared secretly with the entity requesting preferred transport among other ways.

(ii) In another embodiment of the present invention, the authentication can occur in real time for example by the network access operator requesting authentic responses from a server or other network node operated by the entity requesting authentication. Such a real time authentication may be accomplished using one-way authentication techniques such as single key cryptography, or by two-way authentication techniques such as a twin key or public key/private key exchange.

Once the access network operator identifies a tag, authenticates a tag, or otherwise permits a tagged transmission request, the access network can commence a flow of information transmission according to the instructions in the tag and the packets of the transmission. Such differentiated treatment can comprise any number of transmission or end user presentation values. Taught herein are a number of exemplary embodiments of such differentiated treatments. These examples are offered as methods of applying the transmission tagging and preference aspects of the present invention. However, other tagging and preference implementations will be apparent to those skilled in the art, and the tagging and preference aspects are not limited to the particular applications described.

Those examples include, among others, increasing bandwidth to be allocated to the transmission beyond the access network operator's default levels; lifting rate limitations that may be in place restricting certain application or content from transmission or reception on the access network; lifting byte caps or byte counters used to meter the consumption of bandwidth on the access network; eliminating double billing for network access usage when certain types of content are consumed (for example, a pay per view movie should not be charged upon selection, and then again with usage fees or byte cap meters); preferring legal content and discouraging illegal transmissions as a way to meet and enforce regulatory requirements of digital content distribution (for example, copyright-protected content should not be distributed without digital rights enforcement); reselling network access to content providers as a way of providing access to broadband access subscribers and distributing content, in which content providers may share revenues or pay for carriage; and permitting end users to purchase higher bandwidth upon demand as a means of enhancing the time-based value of content.

The following descriptions are presented in terms of display images, algorithms, and symbolic representations of operations of data bits within the memory of computer devices and nodes in a digital communications network. These algorithmic descriptions and representations are the means used by those skilled in the data processing arts to convey most effectively the substance of their work to others skilled in the art. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations can also be machine operations performed in conjunction with a human operator. Useful machines for performing the operations of the present invention include general purpose digital computers, network switches, hubs, routers or other similar devices effecting decisions regarding the transmission of data. In all cases, there should be borne in mind the distinction between the method operations of operating a computer or a network node and the method of computation or transmission itself. The present invention relates to method steps for operating computers and those network nodes and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

One aspect of the present invention relates to the transmission of information to end users by a network access provider. Those users can be, but are not limited to, retail subscribers. That network can be the Internet or any widely accessible network of digital communications devices. That network access provider can be, but is not limited to, a broadband access provider such as a telephone carrier offering digital subscriber line access to the Internet, or a multiple service operator of a cable television system offering subscribers broadband access to the Internet via cable modem. Any of the examples or processes ascribed to a broadband subscriber service, network access provider, or network operator can be performed by any of the foregoing, or by any aggregate provider of access to any digital communications network accessed by at least two end points.

Many embodiments of the present invention are possible and various methods of implementing the invention will be apparent to those skilled in the art. However, one particular embodiment of the invention will be described in detail with reference to the accompanying figures.

FIG. 1 depicts a basic topology of a typical public broadband telecommunications access network within which the present invention operates. One example of such an access network is a broadband subscriber access network. Public users typically rely on such networks to access very large worldwide computer networks such as the Internet. Most of the examples in this specification reference such broadband subscriber access networks and the Internet. Examples of major broadband subscriber access networks currently in operation in North America include Comcast, TimeWarner, and BellSouth. In some instances, access is provided to end users over the cable television infrastructure. In other instances, access is provided by means of special so-called "digital subscriber line" or DSL connections offered by a local telephone carrier. In still other instances, at least downstream connectivity can be provided via satellite or other wireless communications systems such as MMDS or LMDS. The depiction of FIG. 1 illustrates the way in which an access provider using any of these modalities typically provides subscribers with access to the Internet.

That topology is divided into three areas—a Core area 100, a Distribution area 130, and an Access area 150.

Core area 100 can connect to an access provider's core network 105 (which can be a DOCSIS compliant network) with multiple points of presence such as POP 110 used for interconnecting the access network's headends and bridging to access the Internet backbone. Such POPs in turn interconnect outside of the access provider's network to other POPs connected to the Internet by other access providers such as network clouds 115 offered by providers like Sprint, UUNet or Digex, and to the regional data centers 120 for services that remain on the providers network.

Figure 2:
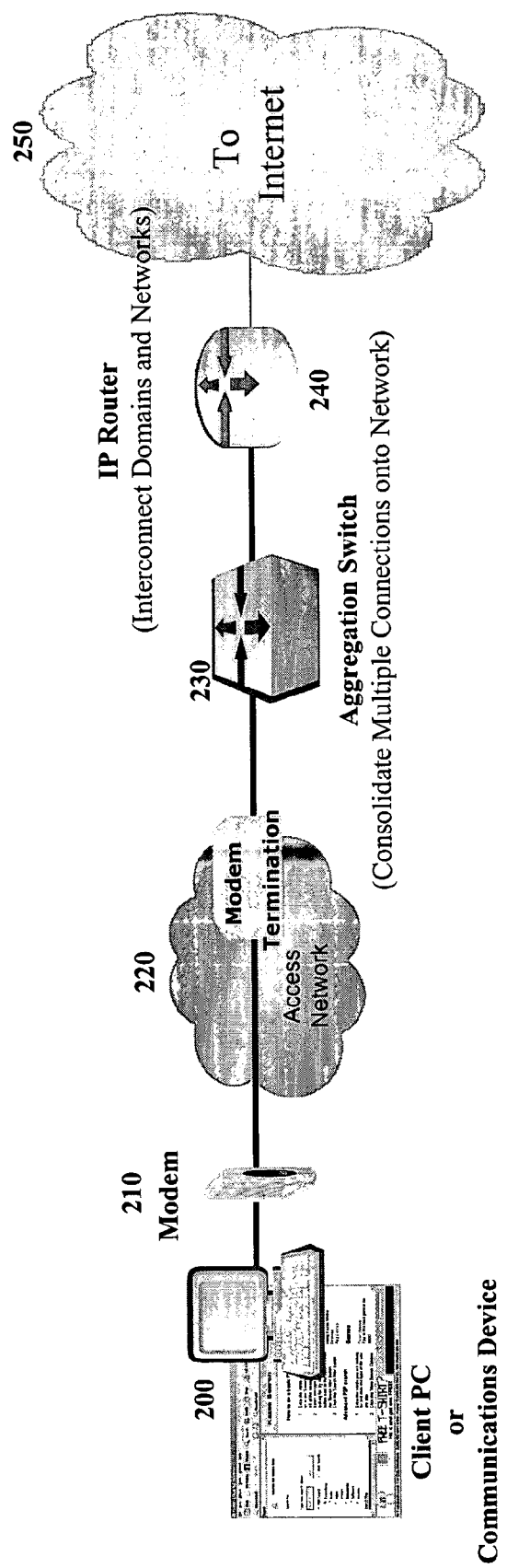
FIG. 2 illustrates a communications link between a cable modem broadband subscriber and the Internet in an MSO administered broadband subscriber network.

FIG. 2 illustrates the path by which a broadband access network interconnects an end-subscriber to the Internet. A communications device 200 can connect with a broadband access network by means of a customer premises transport device, such as a modem 210. Such a modem 210 can function to receive digital transmissions from the communications device 210, and modulate them into the carrier wave used to transmit information over the broadband access network's wires, and demodulate incoming carrier wave signals into digital data transmissions. That modem 210 can connect, over the access provider's wires or radio spectrum to the access network's central facilities described above, at which point another modem termination device may either modulate/demodulate signals or forward them to the next hop in the network. That modem termination device interconnects with at least one aggregation switch 230 that communicates with a plurality of subscriber premises, and in turn interconnects with an IP router 240. That IP router 240 is able to direct packets to their various destinations within the access provider's network or in a wide area or public network such as the Internet 250, and receive packets from the Internet for routing throughout the broadband access network.

FIG. 2 illustrates the path by which a broadband access network interconnects an end-subscriber to the Internet. A communications device 200 can connect with a broadband access network by means of a customer premises transport device, such as a modem 210. Such a modem 210 can function to receive digital transmissions from the communications device 210, and modulate them into the carrier wave used to transmit information over the broadband access network's wires, and demodulate incoming carrier wave signals into digital data transmissions. That modem 210 can connect, over the access provider's wires or radio spectrum to the access network's central facilities described above, at which point another modem termination device may either modulate/demodulate signals or forward them to the next hop in the network. That modem termination device interconnects with at least one aggregation switch 230 that communicates with a plurality of subscriber premises, and in turn interconnects with an IP router 240. That IP router 240 is able to direct packets to their various destinations within the access provider's network or in a wide area or public network such as the Internet, and receive packets from the Internet for routing throughout the broadband access network.

Figure 3:
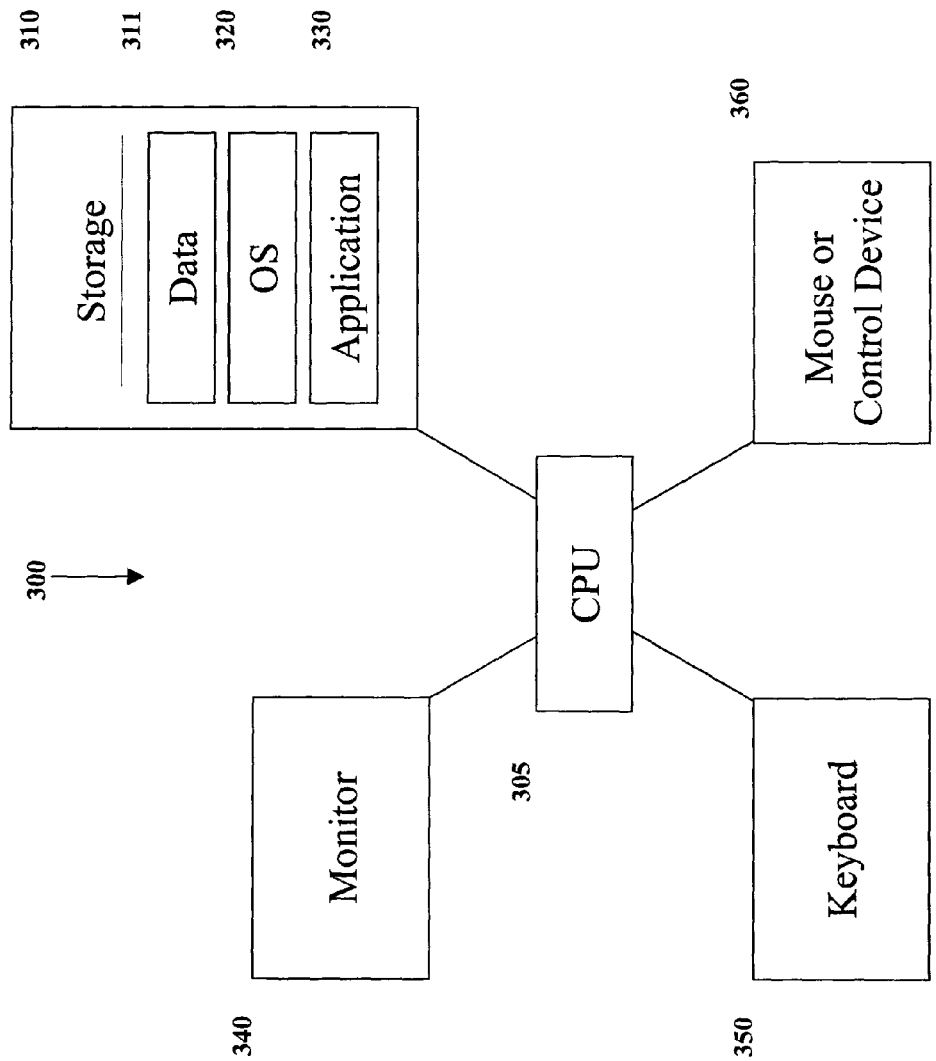
FIG. 3 illustrates an architecture of a personal computer such as a personal computer connected by subscribers to a network access provider such as a broadband subscriber network.

FIG. 3 illustrates a computer 300 in accordance with one aspect of the present invention. The computer 300 is one example of the communications device 200 of FIG. 2. The computer 300 may be or include a personal computer, minicomputer, microcomputer, mainframe computer, personal digital assistant, hand-held device, or cellular telephone. The computer 300 can be used as a number of elements in the present system. For example, one or more computers 300 can be used as client Internet access devices, content servers, or by access network operators for various management, control, administrative, or operational roles.

The computer 300 includes a processor 305, which may be or include a standard digital computer microprocessor, such as, for example, a CPU of the Intel Pentium series. Processor 305 runs system software 320 (such as, for example, Microsoft Windows®, Mac OS® or another operating system for general purpose computers), which is stored on storage unit 310, e.g., a standard internal fixed disk drive. Application programs 330, also stored on storage unit 310, include, for example, computer program code for receiving, using, and sending information from and to a public network such as the Internet. Examples of common application programs 330 include web browsers, Internet telephone programs, streaming media players, e-mail or newsgroup clients, and peer-to-peer distribution clients. Application programs 300 carry out many of the client side tasks and steps described below, including the exchanges of authentication information with a preferred transport apparatus under present invention. Human-readable output is transmitted from processor 305 to an output device such as a video monitor 340 for display to users, and many computers 300 also include speakers, printers or other multimedia output devices. Users utilize input devices such as standard personal computer keyboard 350, cursor control device 360 (e.g., a mouse or trackball), touch-screen sensors on the monitor display, virtual reality gloves, voice input, or similar techniques to enter commands employed during their access and use of public computer networks. Software for implementing a client under the present invention may be stored in a variety of locations and in a variety of mediums, including without limitation, RAM, data storage 111, a network server, a fixed or portable hard disk drive, an optical disk, or a floppy disk.

Figure 4:
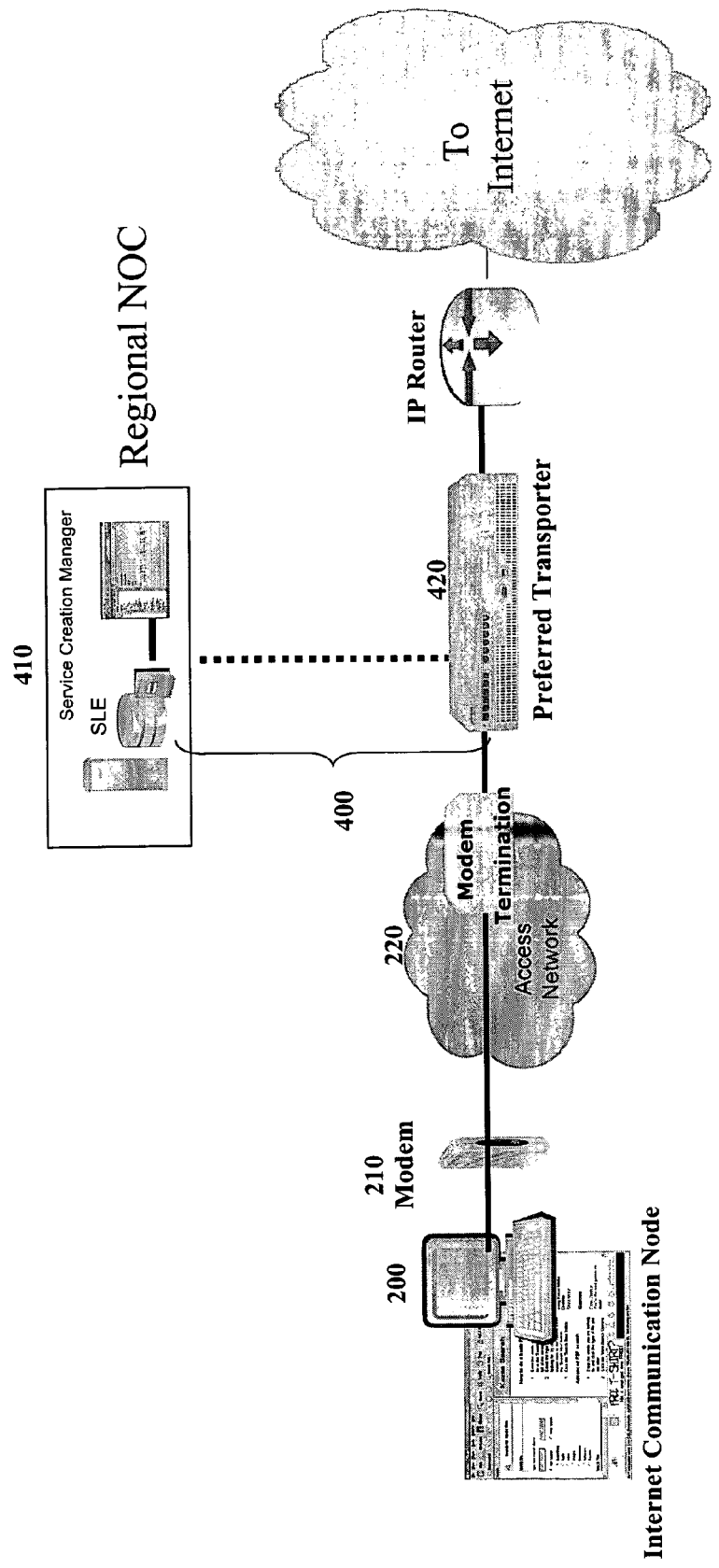
FIG. 4 illustrates a communications link between a cable modem broadband subscriber and the Internet in an MSO administered broadband subscriber network employing a Preferred Transporter under the present invention.

FIG. 4 depicts the path by which a broadband access network interconnects an end-subscriber to the Internet. The path includes elements depicted in FIG. 2. The path also includes a preferred transporter 400, comprised of a service logic engine 410 and a preferred transporter switch 420. The preferred transporter 400 is used, for example, to identify, interpret, and authenticate tags appended to transmissions or content; and at times to interact with the sending entity or the content originator to determine and execute specified preferred transport parameters. The preferred transporter switch 420 is a flow-based IP appliance that interprets, recognizes and manages flows between the existing equipment and nodes of the Internet or of the broadband access network. A preferred transport could be embodied in a variety of network elements, such as client or server software, specialized network appliances, or as a subsystem on an existing network element.

Figure 5:
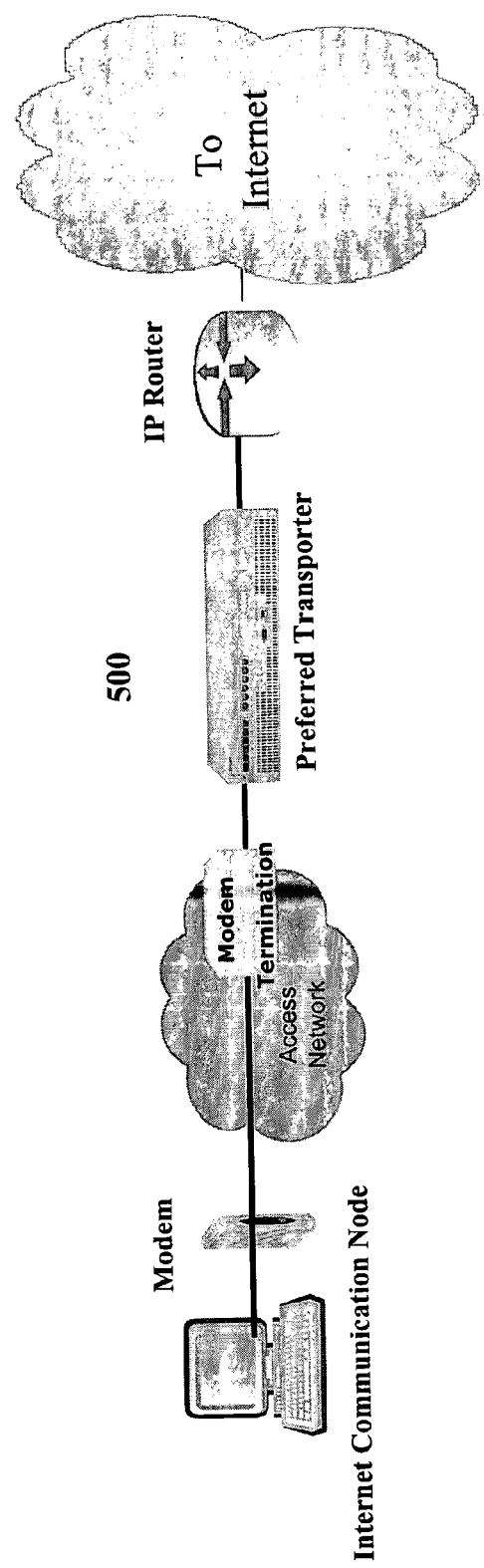
FIG. 5 illustrates the communications link of FIG. 4.

FIG. 5 shows the path of FIG. 4, in which both the hardware switch and service logic elements of a preferred transporter are shown as a single block 500.

A preferred transporter under the present invention can be extensible so that it operates to identify and afford the expected transport for content coming from the outside to the inside of a broadband subscriber network, from the inside to the outside of a broadband subscriber network, or from one node inside to another node inside of a broadband subscriber access network. A preferred transporter can operate in any point to point, point to multipoint, or multipoint to multipoint content distribution scenario.

Broadband content distribution over the Internet may be, for example, implemented as a Server-Client distribution, which is substantially point to point or point to multipoint; or a Peer-to-Peer scenario, which is substantially multipoint to multipoint. Positively identifying content transmissions for preferred transport in the former scenario can, in some implementations, be accomplished on an apriori basis between a preferred transporter and any provider of broadband content.

However, the peer to peer scenario involves so many individual nodes both within and outside of a broadband access network demanding both send and receive requests, that case-by-case measures are not favored. To solve this complexity in authenticating content in mid-transmission, one embodiment enables any application to register with the preferred transporter allowing subscriber devices running that application in accordance with parameters agreed between the application provider and the preferred transporter. A further embodiment of the present invention enables that identification and treatment for preferred transport to be embedded in tags that are coupled to the content. Those tags can be identified, read, authenticated and followed by a preferred transporter, or a sending server upon sending a transmission request to a preferred transporter. In this way, a preferred transporter under the present invention would always afford the same treatment to identically tagged content files, regardless of which content server, or peer to peer client is sending the content file. This allows original content to be distributed with the same preferred transport and authentication measures even after it leaves the originating server and is served by anonymous nodes with in a peer-to-peer network. Examples of tagging content and ways in which a preferred transporter reads, obeys and enforces those tags are provided below.

Figure 6:
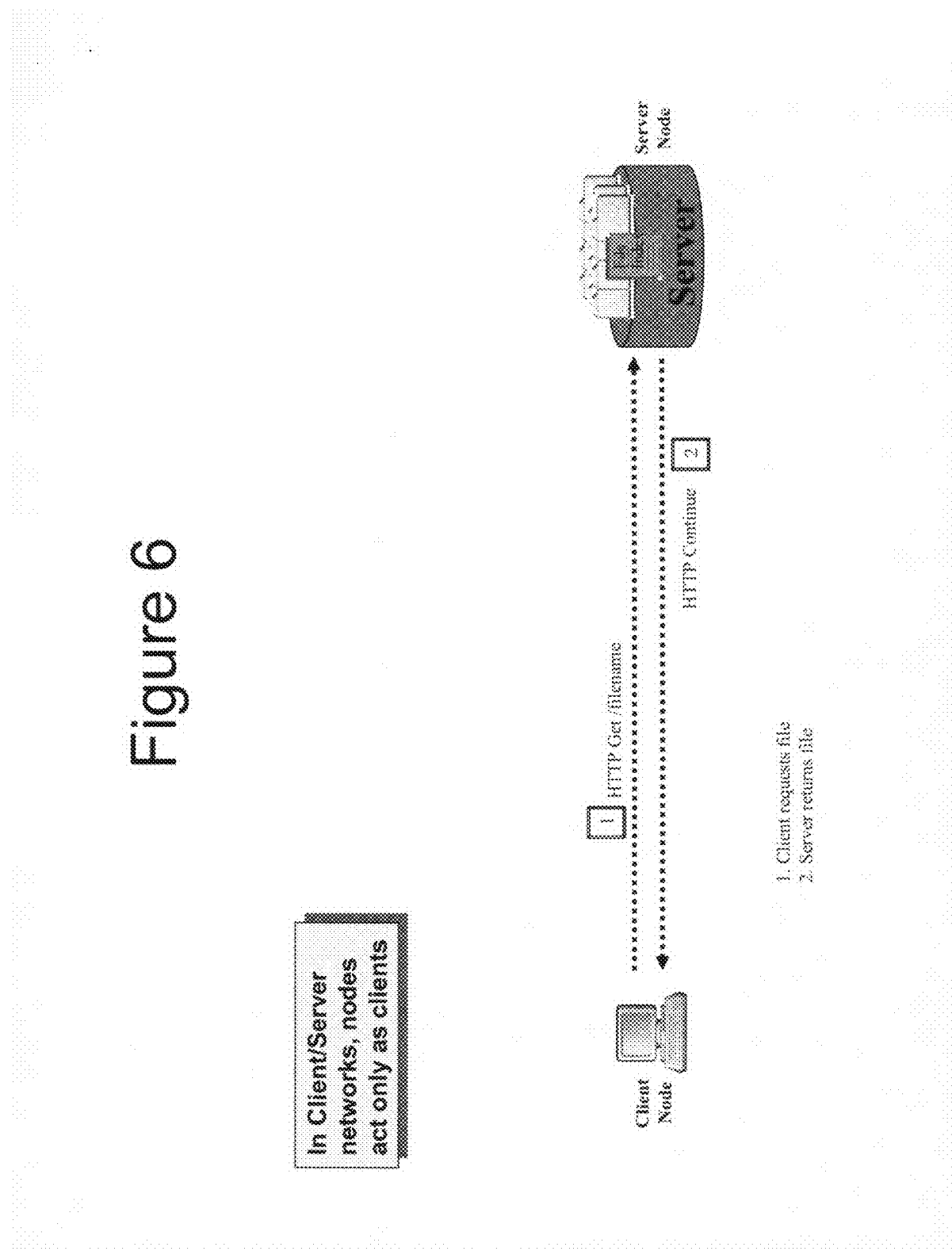
FIG. 6 illustrates a communications link between a client and a content server in a digital communications network.
Figure 7:
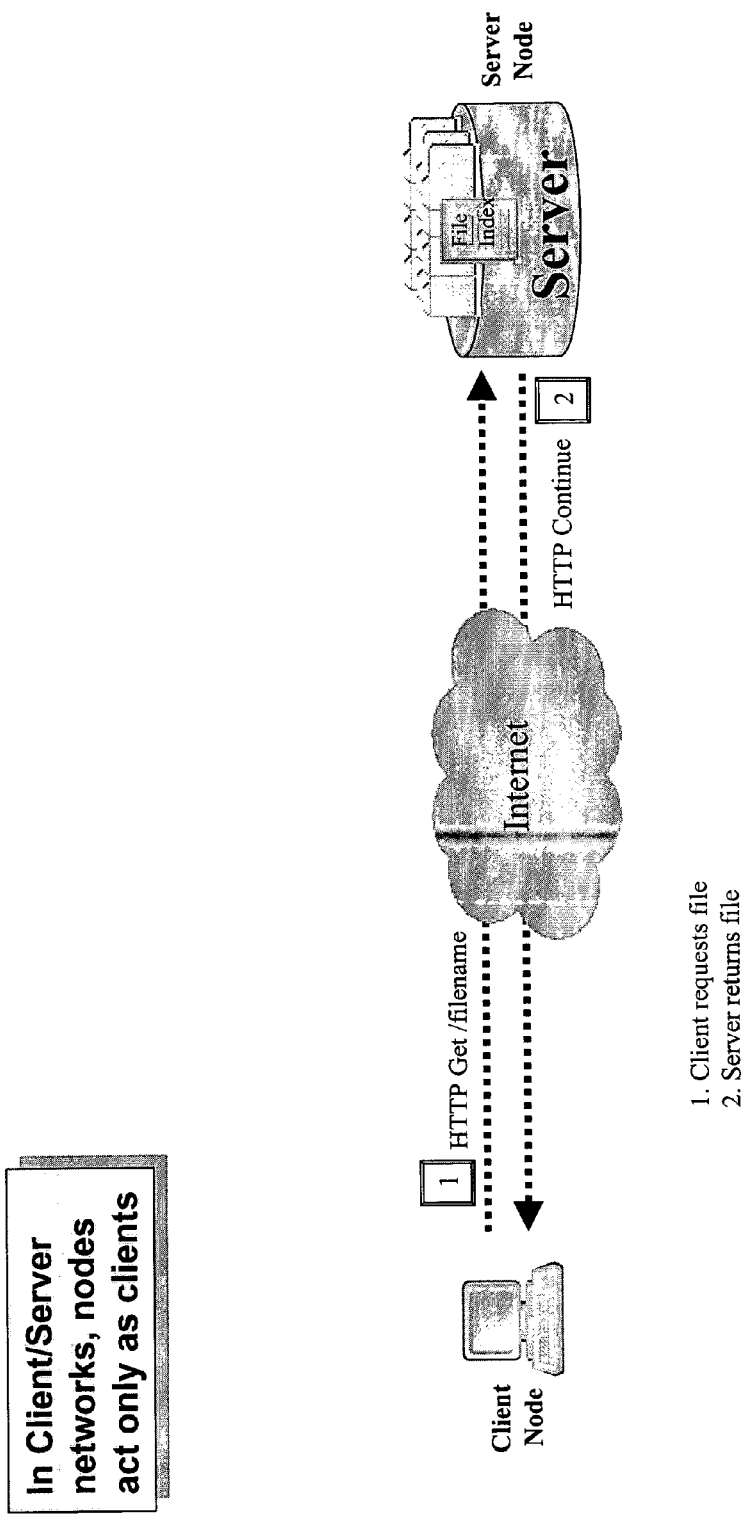
FIG. 7 illustrates a communications link between a client and a content server in a digital communications network interconnected by the Internet.
Figure 8:
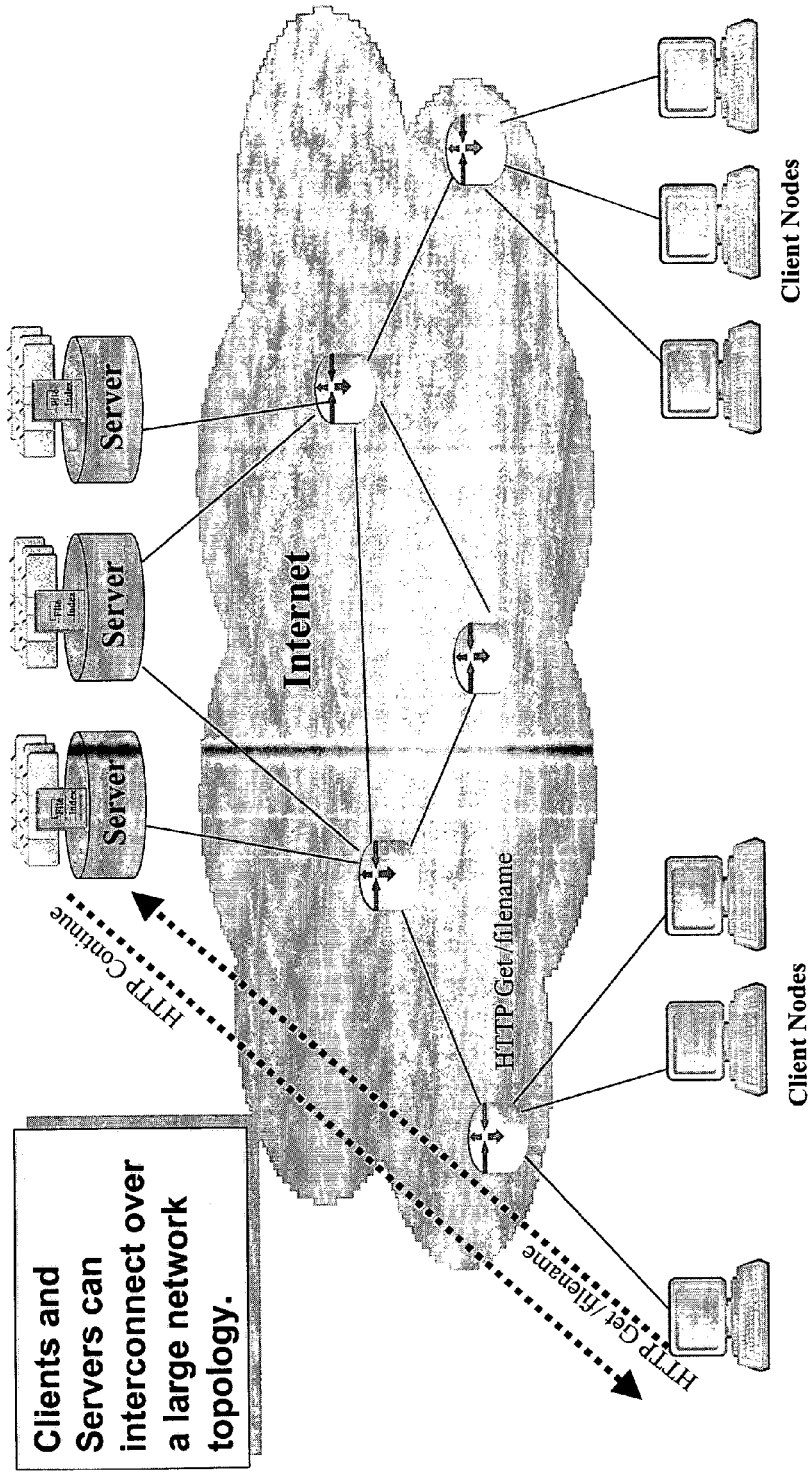
FIG. 8 illustrates a network topology of requesting clients and transmitting clients over the Internet.
Figure 9:
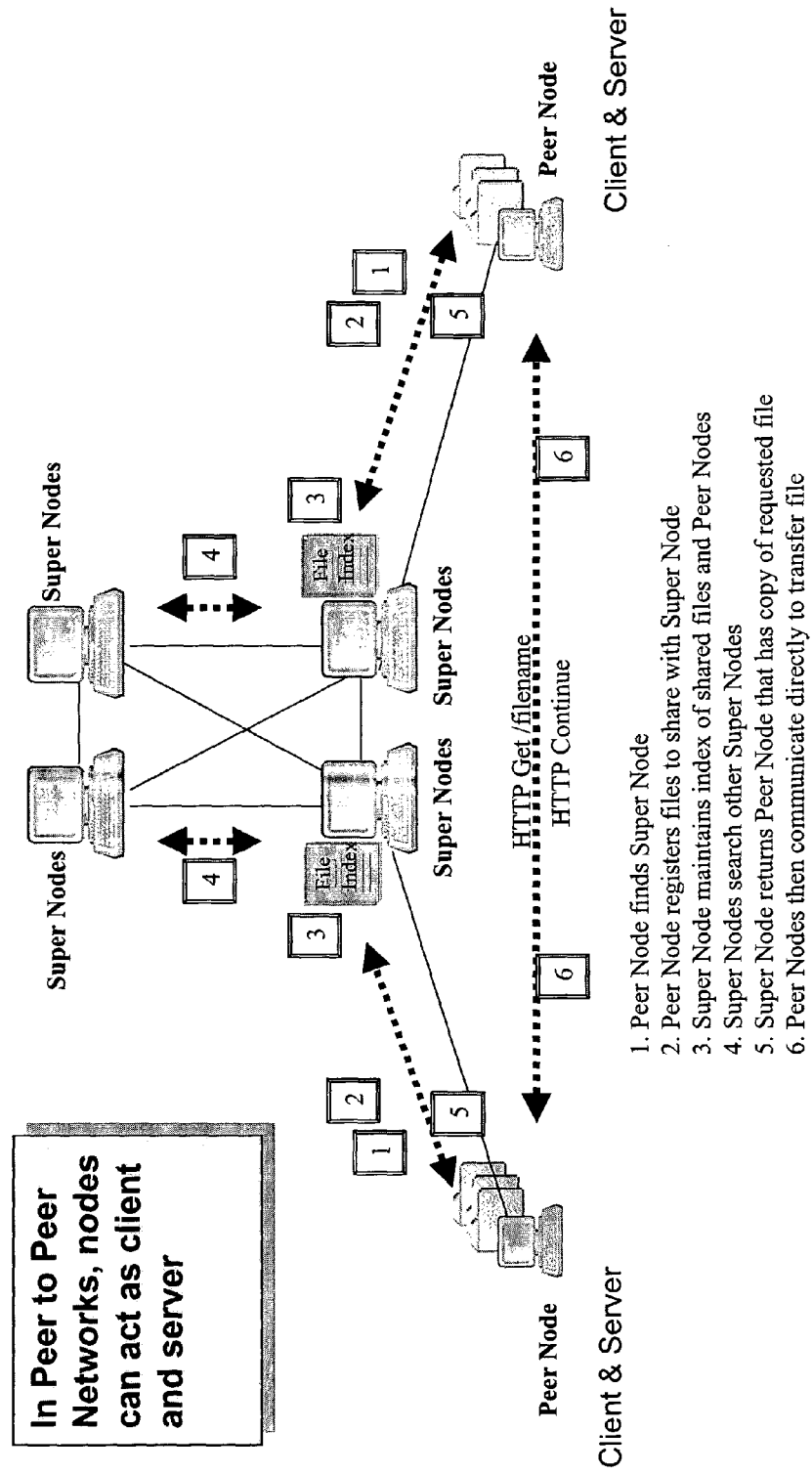
FIG. 9 illustrates a network topology of a peer-to-peer content distribution networks.
Figure 10:
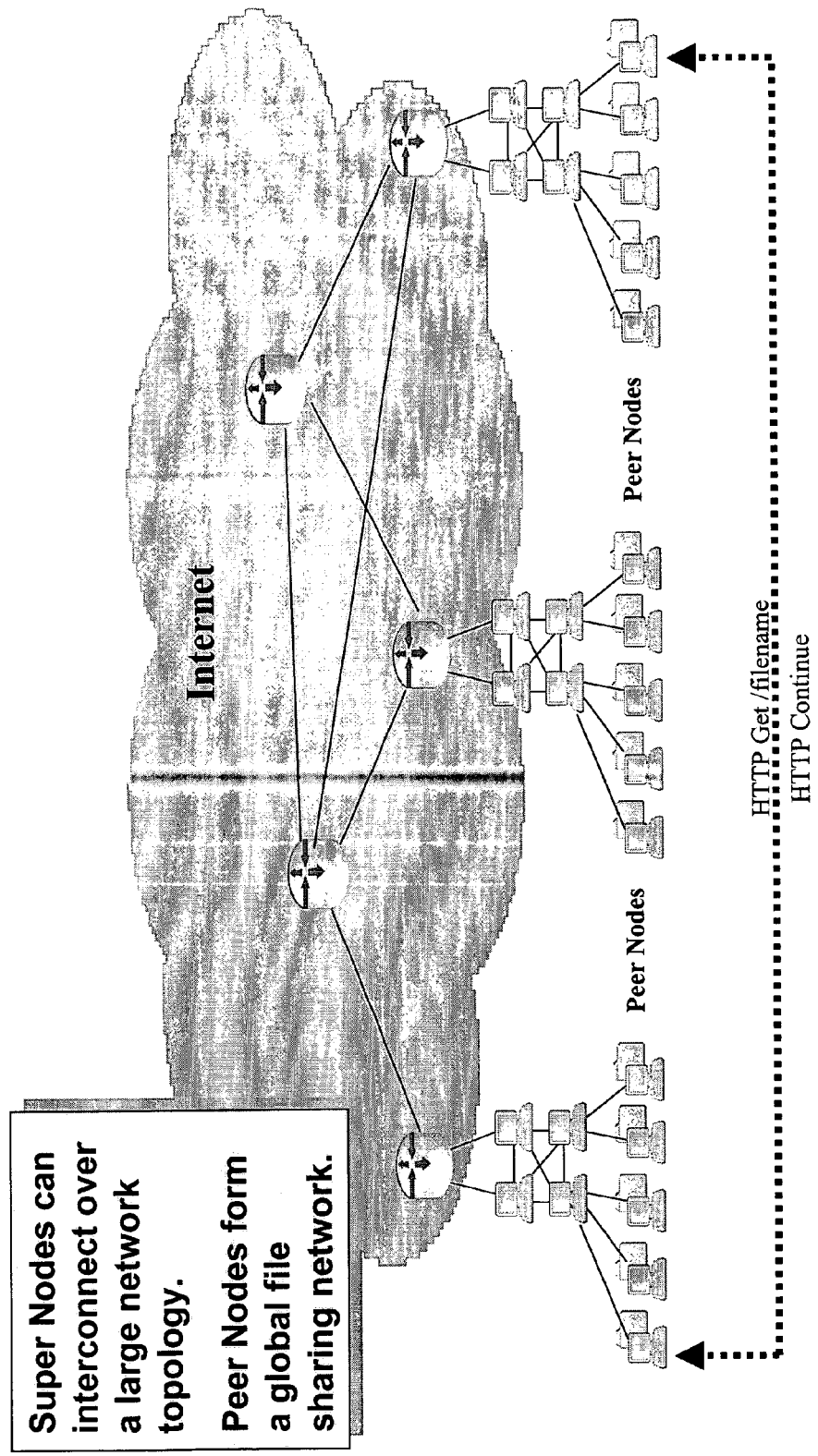
FIG. 10 illustrates a network topology of a peer-to-peer content distribution network interconnected by the Internet.

FIG. 6 illustrates a basic point to point content server to Internet client connection, and FIG. 7 illustrates the same type of point to point content server to Internet client connection, intermediated or delivered over a public packet switch network such as the Internet. FIG. 8 illustrates a communications network used by content servers to transmit files to clients. FIGS. 9 and 10 illustrate peer to peer, multipoint to multipoint content distribution scenarios.

FIGS. 5-10 reference a command syntax used in hypertext transfer protocol (http) for requesting transmission of stored files, and sending those files in response. Http is explained in detail in the Internet Engineering Task Force RFC 1945 HTTP, which is incorporated herein by reference in its entirety.

One embodiment of the invention incorporates a preferred transport subsystem that can be deployed in a number of implementations of preferred transport. This preferred transport subsystem is referred to as a "flow based" access network architecture. The flow based access network architecture is a preferred transport subsystem that can be deployed in a number of the embodiments of preferred transport under the present invention. Such a network architecture is equipped with hardware or software components allowing key network management elements to treat information transmissions on a file or a per-transmission basis rather than just on a packet basis. In one embodiment, the flow based system includes flow-based switching managed by a flow table. Such flow tables give identity to end-to-end or source-to-destination communication exchanges. In the flow-based architecture, upon packet arrival, certain fields are extracted from the packet, and flow-based elements use a unique identifier as a key into the flow table. If there is a match, then the packet is switched in process according to the service attributes of the flow table entry. Otherwise, the packet is further processed in order to establish a new flow entry in that flow table. An access network's objective in employing a flow-based subsystem is to ensure that every packet in a transmission flow is accorded the same service, and avoiding the need to assess and assign service to every individual packet.

The flow based access network architecture in accordance with one particular embodiment of the present invention will be described with reference to FIGS. 11-13.

Figure 11:
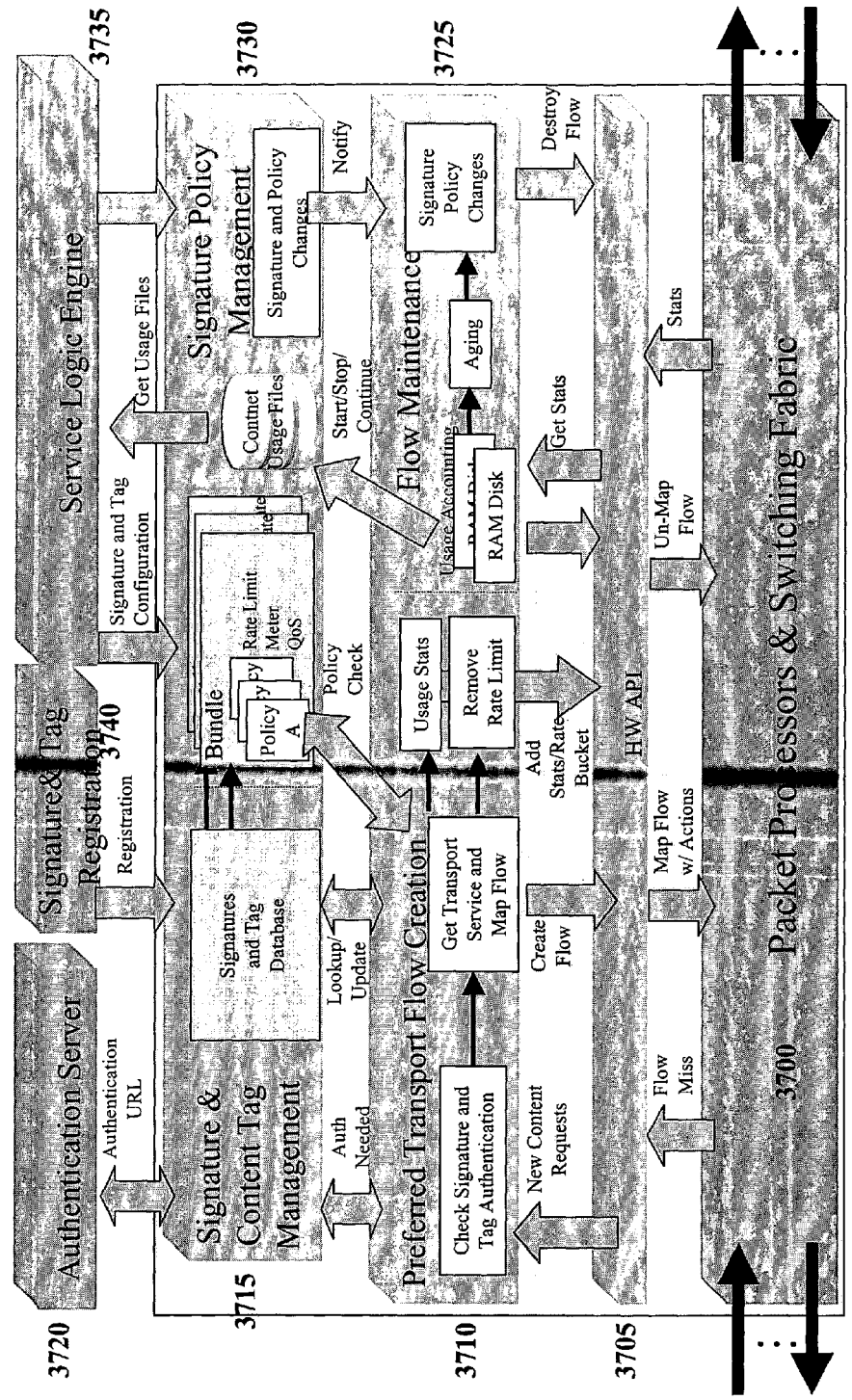
FIG. 11 illustrates a functional block diagram of a flow-based preferred transporter in accordance with one aspect of the present invention.

FIG. 11 illustrates a functional block diagram of a flow-based preferred transporter in accordance with one aspect of the present invention. In one embodiment, elements of a flow-based subsystem include packet processing in such a way as to recognize flows between end-to-end systems and applications. Flows are managed by a component that determines when to create new flows, and another element that maintains existing flows including removing them from the flow table whenever they are not being used, or changing the transmission characteristics during the carriage of a flow. Packet processing and flow switching can be implemented in hardware, software or a combination thereof.

In such a system, packet processor and switching fabric 3700 includes hardware, software, or a combination thereof, that receives packets, extracts certain fields from the packets and payload to form a flow key, and looks up in a flow table for a match. Upon a match, the packet processor and switching fabric 3700 perform a switching function transporting the packets through one or more physical interfaces or communications ports. That action may include updating statistics, counters, or applying rate limiting, or other flow based services that are desired by an access network.

Upon a miss in the flow lookup, packet processor and switching fabric 3700 can hand the packet off to a non-switching element (such as, for example, transporting through a HW API 3705 to a non-switching component such as a preferred transport flow creation block 3710). Such a non-switching element can further process the packet to determine and possibly create a flow table entry. If that preferred transport flow creation block 3710 determines that a new flow is required, then the HW API 3705 could create a flow table entry for the packet processor and switching fabric 3700 with respect to the inspected packet and further packets in that flow. (Whether further packets belong in that flow are determined by a number of criteria as discussed above in the definition of "Flow.") Further to determining and identifying a new flow in the flow table, that preferred transport flow creation step 3710 also may instruct the packet processor and switching fabric 3700 as to the service attributes to be accorded to that newly created flow.

In one embodiment, the flow-based preferred transporter also includes a signature & content tag management block 3715, an authentication server block 3720, a flow maintenance block 3725 (including, for example, a signature policy change function), a signature policy management block 3730 a service logic engine 3735, and a signature registration block 3740.

One aspect of the present invention can recognize affirmatively marked or "tagged" content (as described below). Once recognized, a tagged content transmission can be processed for preferred transport, regardless of the communications path or port that it comes in by—that is, regardless of the source or destination of the transmission. This content tag recognition scheme therefore would override the traditional flow creation variables and flow maintenance parameters, in favor of following predetermined instructions intended for content transmissions identified with those tags.

Preferred transport flow creation block 3710 may recognize the use of a content tag and can establish a flow based on the instructions indicated by the tag. In one embodiment, some tags require authentication, under a more secure flow-creation and treatment embodiment described below. A Signature and Content Tag Management element 3715 can carry out that task when necessary. In addition to managing the authentication of that tag, that signature and content tag management block 3715 might manage the association of signatures and tags with communications parameters.

In one embodiment, the flow-based preferred transporter also includes an authentication server 3720. The authentication server 3720 is, for example, any node in the network that performs tag authentication. This can be a separate device coupled to the preferred transporter and managed by the access network provider. Alternately or in addition, the authentication block 3720 is included in originating content server, or in the computer of the requesting subscriber within the access network itself. In still other cases, such as peer to peer distribution of authorized content, where content providers are not otherwise in control of distribution, the authentication function of block 3720 can be performed by an authentication server existing separate from the access network, subscriber or content transmission server. These cases are discussed more fully below. Such an authentication server 3720 can be any type of authentication apparatus known in the art including, by way of example only, a Radius server, Kerberos, RSA, Microsoft Passport, etc.

A flow maintenance component 3725 is responsible for managing the flow table by modifying existing flow table entries that are no longer needed such as when a flow is no longer being used or the entry has been aged. That flow maintenance component 3725 also updates existing flows with any service changes.

A signature policy management block 3730 is responsible for configuring and managing preferred transport service associated with a flow that is bound to a signature, content tag or both.

A signature and tag registration block 3740 allows trusted registration of signature and/or tag at the preferred transporter by (i) an authorized content sending node such as an Internet media service or sending application like a Internet telephony client; (ii) an authorized content originator such as a musician or video producer; (iii) any other trusted third party content owner or distributor.

In this flow-based subsystem improved for use by the present invention, a server-based component provides the engine for service configuration and management logic Service Logic Engine 3735 performs additional tasks that are unique for preferred transport. Those types of tasks include for example management, configuration and maintenance of signatures and tags within the preferred transport node. The server component, while shown as an external component from the Preferred Transporter, could be integrated into the Preferred Transporter or some other network element.

Figure 12:
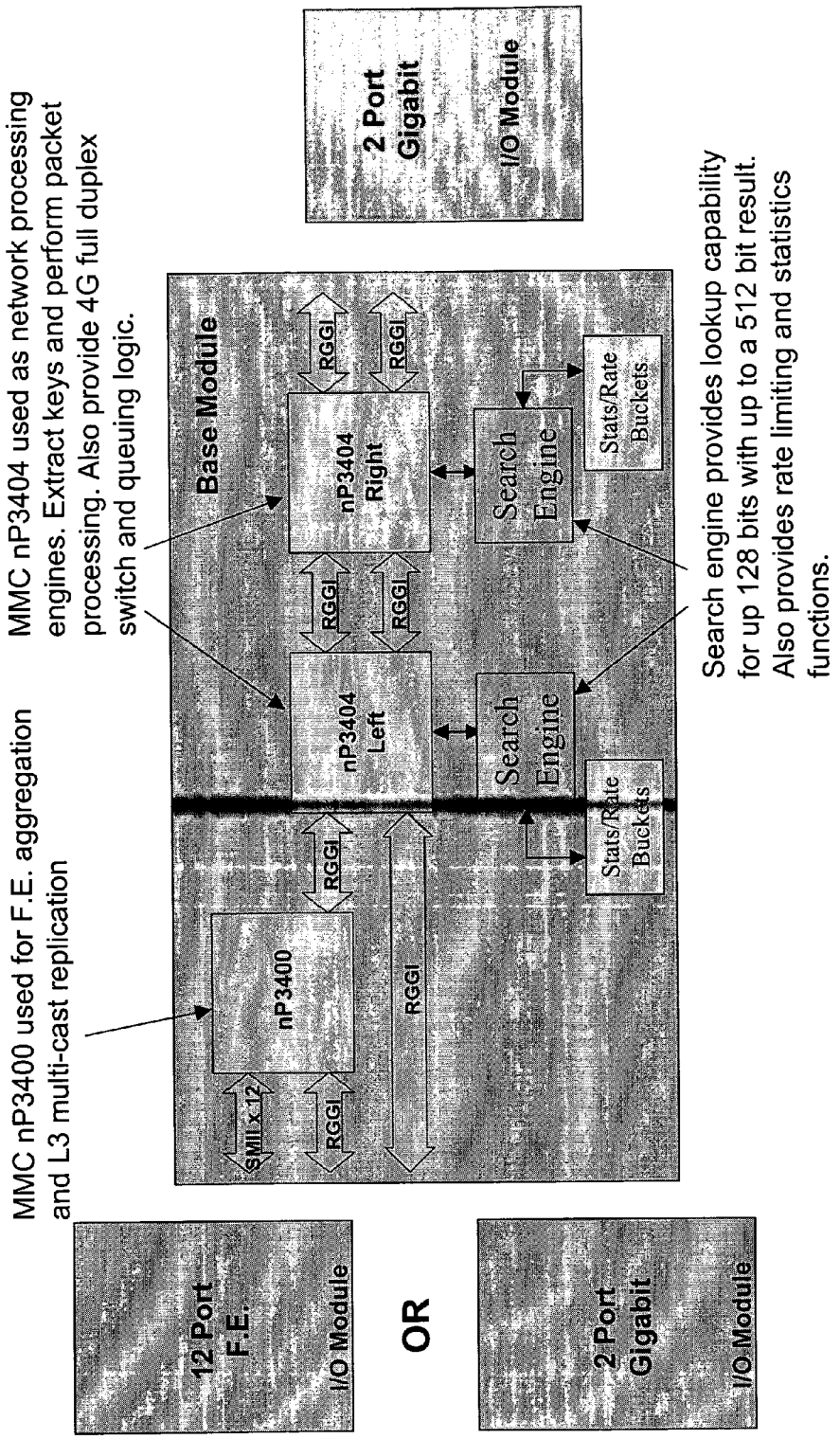
FIG. 12 illustrates a functional block diagram of a hardware implementation capable of implementing the functions of the packet processor and switching fabric, in accordance with one aspect of the present invention.
Figure 13:
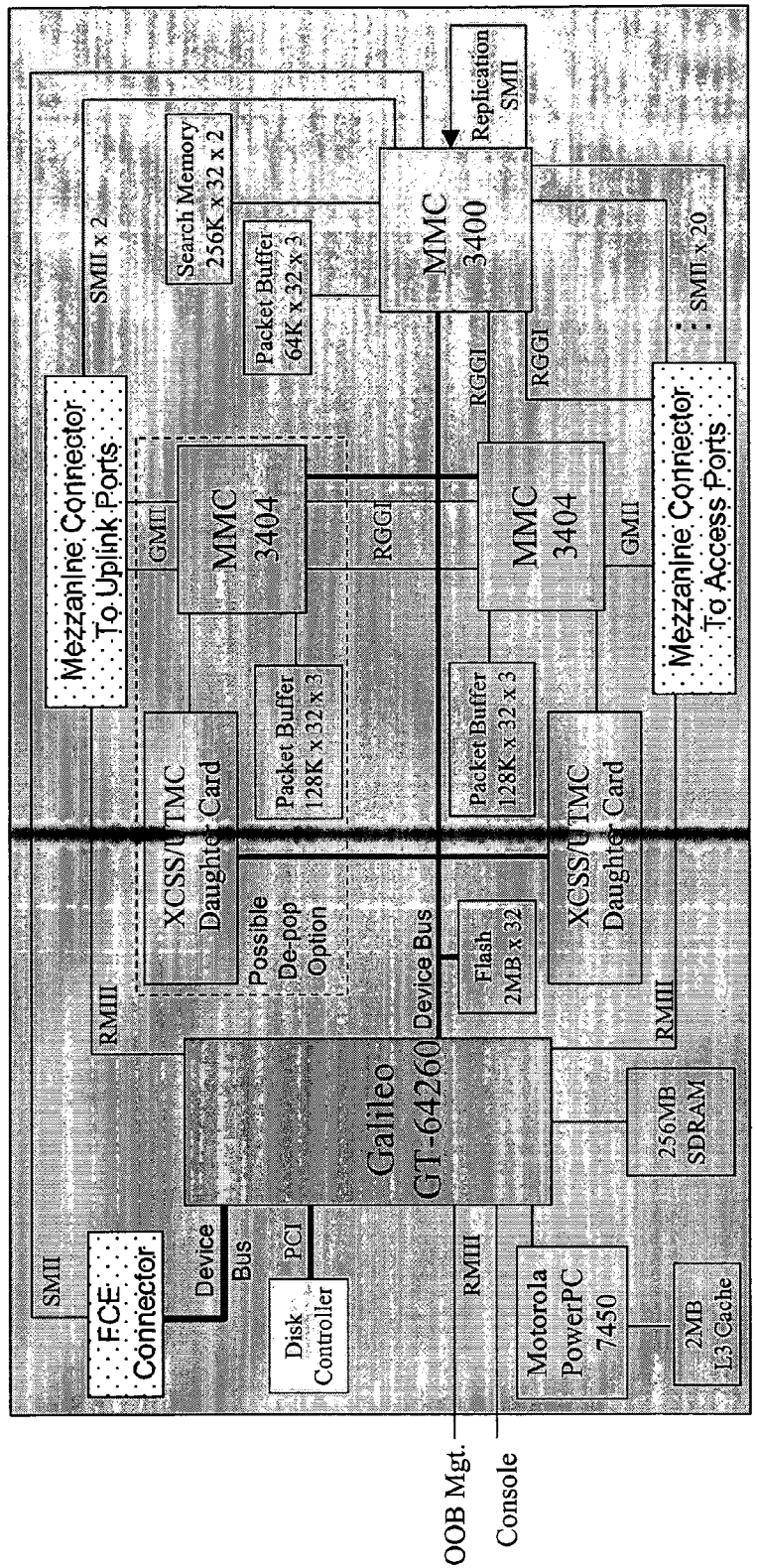
FIG. 13 illustrates a full hardware instantiation of a preferred transporter apparatus in accordance with one aspect of the present invention.

FIG. 12 illustrates a functional block diagram of a hardware implementation capable of implementing the functions of the packet processor and switching fabric 3700 of FIG. 11. FIG. 13 illustrates a full hardware instantiation of a preferred transporter apparatus capable of carrying out all of the program functions of FIG. 11.

In embodiments, a Preferred Transporter may be implemented in an embodiment that is not flow-based, but still provide preferred transport to a series of packet transmissions.

In one embodiment of the present invention, transmissions may be positively identified and authenticated by the sending node, for example, at the access provider level.

In one embodiment providing this identification and authentication functionality, the present invention provides a method and apparatus to achieve a compromise between the public's and content providers' need to distribute large files efficiently while compensating the broadband access providers for opening their plant for this shared distribution task. Namely, the present invention provides means for any entity sending content over the Internet, be it a central server or even an application such as a peer to peer program running at a single subscriber's computer, to authenticate at a preferred transporter. Based on policies or rules regarding content types, subscriber ID, application type, or any other parameter, such a preferred transporter would allocate proper transport. Proper transport might entail tailoring data transmission in any number of ways such as by alleviating rate limits or byte caps, or even or even by offering burst capacity for participating transmitters per prior agreement or special policy.

The preferred transporter monitors those distribution events for purposes, among others, of accounting and receiving payment from sending entities or subscribers for that premium transport service. In a further embodiment, taught here is a system of tagging content for preferred transport purposes, such that content itself can be recognized by origin, authenticated regardless of sending entity.

Under a further implementation of the present invention, a preferred transporter enables access providers to offer tiered service models based not only on the maximum amount of bandwidth available to a subscriber, but on offering certain applications, information services, or sets of content to subscribers on a full time, periodic or as needed on-demand basis. Such tiered service can be offered to subscribers on any number of bases—such as pay per use, monthly subscription for specific transport parameters, introductory offers, bonus service for loyal customers, differentiated service for subscribers belonging to certain neighborhood or condo associations or other groups, or any other basis. Alternatively, tiered service could be afforded for content or transmissions from central servers or by client applications proliferated by content providers with whom the access network has reached special business arrangements.

Such a tiered service model pervades the provision of cable and subscription television. Tiering is by its very nature a way to maximize opportunities in an efficient market by matching supply and demand in a more precise manner. In order to achieve this, access providers need a reliable and verifiable way to identify participating content or transmissions across their network facilities in order to provision appropriate connectivity. That same means could allow the broadband access provider to monitor and measure the transmission of identified content and applications for the purposes of accounting with either the subscribers or the content providers paying for network carriage. In addition, enabling the access provider to account for content types, including but not limited to content attributes or meta data, provides usage and consumption activity reports the can give valuable marketing demographics to originating content owners.

Specifically, in FIG. 11, at signature policy management block 3730, a preferred transporter maintains content usage files storing records of content transmission by content tag attributes. As described more fully below in the discussion of content tag structure and parameters, those attributes can include any of the following among others: sending or requesting application, sending or requesting node, content class, content type, content instance, payment forms, copyright and license information.

Figure 14:
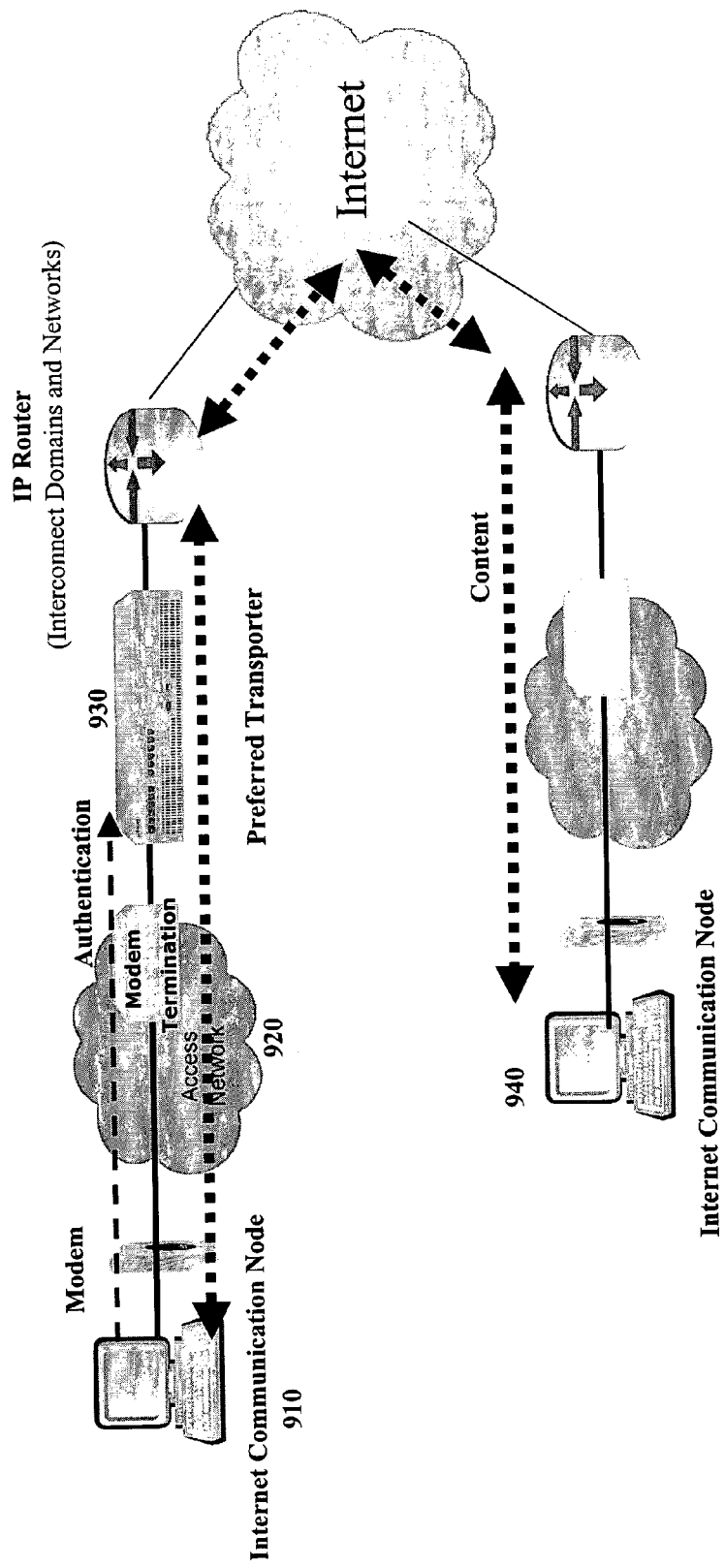
FIG. 14 illustrates a communications link for content carriage and authentication communications between a content transmitting network node inside or outside of a network access provider's subscription service to a receiving client node inside of a network access provider's subscription service such as a broadband subscriber network.

FIG. 14 illustrates a pathway of transmitting content to an authenticated subscriber or requesting application. Authentication can occur between a subscriber's Internet communications node 910 and an access network's facilities 920. A preferred transporter 930 may identify traffic coming in from a content server Internet communications node 940 (likely outside of the broadband access provider's network), and offer it to subscribers authenticated for that content server node 930.

By enabling access providers to be the ones to control access to premium content, a more flexible "bundling" of services model, similar to that use in cable television, avails. For example, an access provider can offer a variety of bundled services enabled by the preferred transport of content. Similar to packaging various content to provide entry-level plans for gaining new market penetration in basic cable TV packages, the access provider can offer an entry-level content plan that serves a new market demographic such as a music-only package or web, email, and music. An access provider can offer new content services and bundles on top of the basic high-speed broadband Internet access. In some instances, an access provider may offer new content services on a pay-per-view (ppv) model, where individual content or application is given preferred transport in conjunction with a financial transaction. If the access provider's fees include usage fees, it may be desirable to exclude preferred transport ppv content from the monthly usage fees for basic access or fixed service plans.

Figure 15:
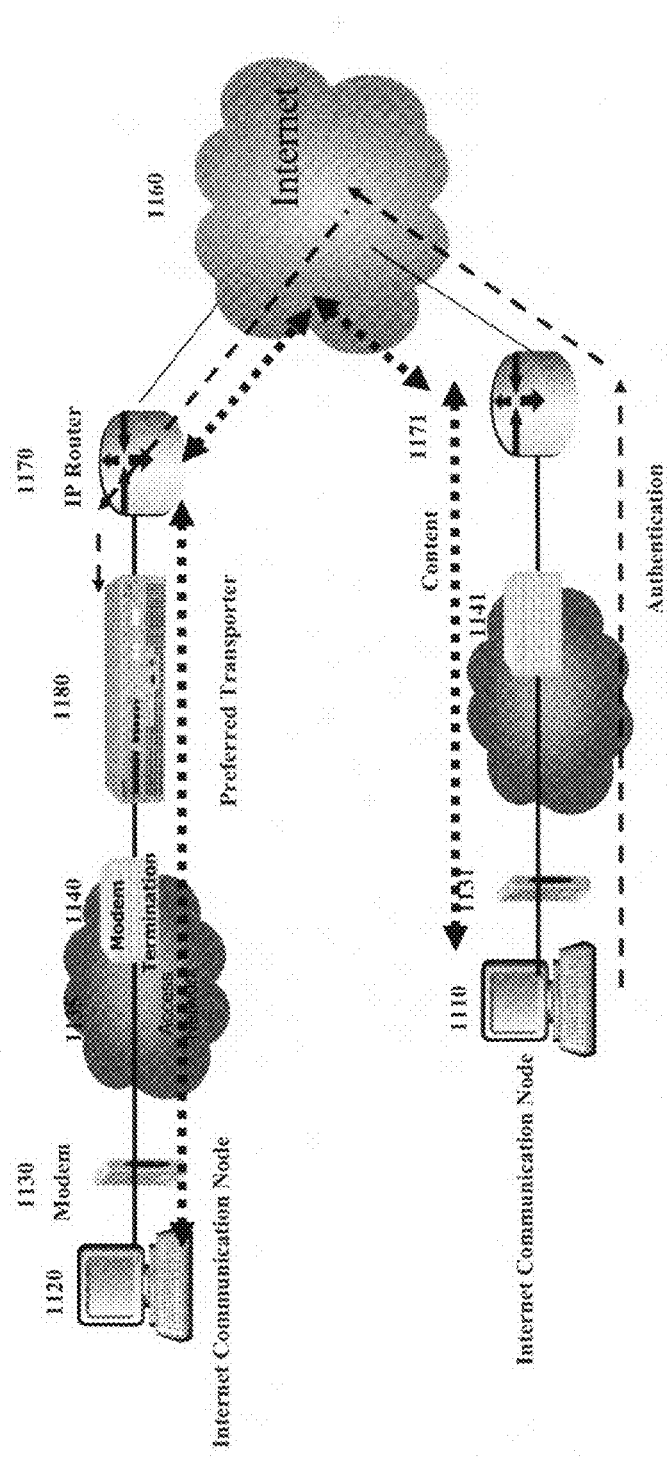
FIG. 15 illustrates a communications link for content carriage and authentication communications, in which authentication may be implemented with a network node other than the node originating the content transmission, in accordance with one aspect of the present invention.
Figure 16:
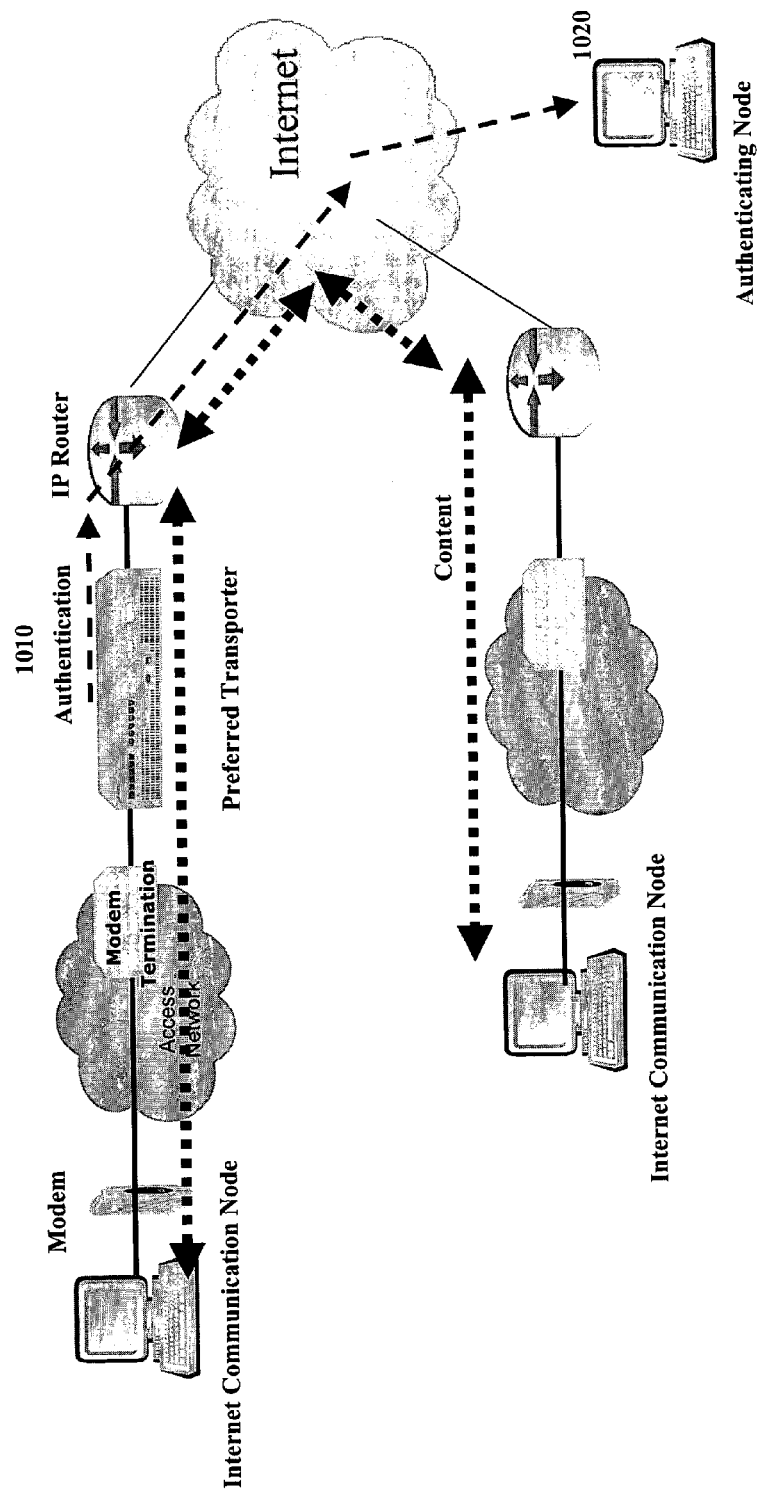
FIG. 16 illustrates a communications link for content carriage and authentication communications, in which authentication may be implemented with a network node other than the node originating the content transmission, in accordance with one aspect of the present invention.

In FIG. 15, the entity being authenticated is not the subscriber's node, but the node 1110 content server outside of the access network being asked to send the preferred service content across the access network to a requesting subscriber node 1120. This type of authentication and preferred transport is used, for example, when particular content classes or types may be restricted to certain applications or market demographics. A specific example entails the distribution of premium content over a peer-to-peer application. Without a preferred transport provisioning authentication of the content and its transport, subscriber node 1120 could usurp the communication port and application signature to access the content. By authenticating at subscriber node 1120 for content served from content server node 1110, premium content and its distribution is maintained at the access network even though the content is served outside the access provider control. Music distribution over a peer to peer network would benefit from this authentication and access network preferred transport.

FIG. 10 illustrates divergent content transmission and authentication pathways. Before sending, or according preferred service, for a flow of broadband content, a preferred transporter 1010 might authenticate a content transmission request at a separate authentication node 1020. Having a separate authentication node associated with a specific content tag could allow content originators to control the exact consumption and transport distribution of every individual content item regardless of how it is distributed over a broadband network. In cases where content can be distributed outside the control of the content originator, content tags authenticated at the access provider network can in this way regain control of the distribution under the authority of the originating content provider. This provides a hybrid model of allowing wide distribution of content while maintaining the content originator's control of how the content is delivered over the transport. A key business benefit enabled by the use of content tags at the access provider network is that it enables the access provider to collect market demographics and content class/type usage, activity, and distribution information that can guide the access provider to structure content offerings or select content partners.

An example will further illustrate the mechanics of diverged content delivery and transmission node authentication through a preferred transport node under the present invention. In this example, the subscriber node 1120 of FIG. 15 is a broadband service subscriber's computer requesting content from an Internet Communication Node 1110 which could be, for example, an online music service. A preferred transporter node 1180 is depicted as a switch operated by a cable modem broadband subscriber service which interconnects subscriber's with its facility via an access network 1135, with each cable modem connection terminating at a Cable Modem Termination Service ("CMTS") 1140.

The CMTS converts the cable infrastructure data payload to IP based packet services for transport over the Internet 1160 through an Internet router 1170 on the client's broadband access network and Internet router 1140 on the server's broadband access network. The Internet 1160 may be made up of multiple public networks or may be a private backbone of the service provider. The broadband service provider happens to have byte cap restrictions in place counting all bytes transmitted and received by the client node 1120 and applying a cap on the number of bytes that can be transmitted or received within a monthly period.

In this example, the subscriber has joined a subscription-based service with the online music service hosting the server node 1110 and for a monthly subscription fee is entitled to unlimited downloads per month.

The client node 1120 runs a client application allowing the subscriber to choose a music selection for download form the server node 1110. This application can be a properly equipped web browser, media player, or another client application that is open to carrying content from multiple providers or dedicated to bringing service only from that online music service. The subscriber at client node 1120 interactively selects a music download selection and the server node 1110 readies the music download for preferred transport by conforming to the agreed application signature and inserting a content tag. The content tag identifies the application, the content class and type, and the preferred transport service (for example: exclude from byte caps). The content tag is authenticated using any at least unidirectional authentication technique (such as a CRC computation) and optionally a secret number shared between the serving entity and the cable operator. Once the content is readied, it is transmitted over the network comprised of cable modem 1131, termination system 1141, Internet access router 1171, the Internet 1160, Internet access router 1170 where it is received by the preferred transporter 1180. Upon receiving the content payload with its signature and content tag, the preferred transport 1180 inspects the content tag and computes the authenticated value inside the tag using (in this example) the CRC and shared secret. Once successful, the preferred transporter 1180 sets up a switching flow table to provide the preferred transport service of high bandwidth and exclusion from counting any downloaded bytes toward the operator byte caps. The preferred transporter can also enforce general access network policies—such as the policy that this type of preferred transport only applies to the download music flows. The preferred transporter 1180 switches the music download flows with preferred transport for the duration of the music download between the client node 1120 and the server node 1110.

The client node 1120 runs a client application allowing the subscriber to choose a music selection for download form the server node 1110. This application can be a properly equipped web browser, media player, or another client application that is open to carrying content from multiple providers or dedicated to bringing service only from that online music service. The subscriber at client node 1120 interactively selects a music download selection and the server node 1110 readies the music download for preferred transport by conforming to the agreed application signature and inserting a content tag. The content tag identifies the application, the content class and type, and the preferred transport service (for example: exclude from byte caps). The content tag is authenticated using any at least unidirectional authentication technique (such as a CRC computation) and optionally a secret number shared between the serving entity and the cable operator. Once the content is readied, it is transmitted over the network comprised of cable modem 1130, termination system 1140, Internet access router 1140, the Internet 1160, Internet access router 1170 where it is received by the preferred transporter 1180. Upon receiving the content payload with its signature and content tag, the preferred transport 1180 inspects the content tag and computes the authenticated value inside the tag using (in this example) the CRC and shared secret. Once successful, the preferred transporter 1180 sets up a switching flow table to provide the preferred transport service of high bandwidth and exclusion from counting any downloaded bytes toward the operator byte caps. The preferred transporter can also enforce general access network policies—such as the policy that this type of preferred transport only applies to the download music flows. The preferred transporter 1180 switches the music download flows with preferred transport for the duration of the music download between the client node 1120 and the server node 1110.

Embodiments of the present invention use content tags associated with data packets. FIG. 17 teaches one form of a content tag structure that can be embedded as part of a client node application signature, for example, inside the content payload header, or associated on a content server as a preferred transport descriptor. In this tag structure, a marker 170 can be used to identify the location of the tag in the packet transmission payload, followed by a length descriptor 172 and a version number 174. The length descriptor 172 can be used to instruct the preferred transporter how many bits in the transmission payload to extract as the content tag. Once the content tag is extracted, it can be inspected and used to affect the transmission, delivery, metering, accounting, and service of the content it describes or represents. In such an embodiment, the tag can contain a version number and reserved fields along with a digital signature used to authenticate its use. Other tag structures are possible.

One aspect of a content tag for preferred transport under the present invention allows complex arrangements to be represented in a simple machine-readable tag that can be bound directly in from of content or can exist separately from the content, perhaps in a request for content or in any other signaling message not directly coupled to the content transmission. For example, that could be a message from a media player requesting that a video stream commence, wherein the video stream itself is not tagged, but that message is tagged to request authenticated preferred transport for the duration of that stream. That "arrangement" can be set by human interaction, or by automated form, with the preferred transporter sending a machine or human actionable registration invitation to new content servers that it encounters.

A content tag, such as the content tag depicted in FIG. 17, can be embedded as part of a client node application signature, inside the content payload header, or associated on a content server as a preferred transport descriptor. In this tag structure, a marker can be used to identify the location of the tag in the packet transmission payload, followed by a length descriptor and a version number. The length can be used to instruct the preferred transporter how many bits in the transmission payload to extract as the content tag. Once the content tag is extracted, it can be inspected and used to affect the transmission, delivery, metering, accounting, and service of the content it describes or represents. In such an embodiment, the tag can contain a version number and reserved fields along with a digital signature used to authenticate its use.

FIG. 18 illustrates one embodiment of a content authentication tag structure in accordance with the present invention. The tag includes the fields tag ID 180, which is a well-known tag identifier indicating the type of tag used; tag length 182, which indicates the remaining length of the tag; tag version 184, which indicates the version of the tag structure being used; transport service 186, which is a bit mask indicating which transport service preferences are to be enabled; authenticated transport 188, which is a digital signature used to authenticate the preferred transport; content class/type 190, which contains the OID syntax from a content class naming tree and indicates the content type; content application 192, which contains the OID syntax from an application naming tree and indicates the application of the content; content originator 194, which contains the OID syntax from a content originator naming tree and indicates the originator of the content; content metadata 196, which contains the OID syntax from a Content Meta Data naming tree and indicates meta data, and authentication URL 198, which contains the URL of the authentication server. Other types of tags containing one or more of these and other fields will be apparent to those skilled in the art.

One embodiment envisions the transport tags being appended to a file request using the HTTP protocol. Another envisions the transport tags being advertised in a manner similar to a lease query in the Internet Domain Name Service. Yet another envisions a content tag distribution protocol wherein all Preferred Transport nodes communicate their knowledge of content tags and usage. For example, known in the art is a tag distribution protocol used by Multi-Protocol-Layer-Switches ("MPLS") to associate protocol tags with reserved paths in the network. Such a mechanism could preferably result in a worldwide content distribution system providing preferred transport at the access provider yet leave control of content distribution in the hands of content originators. This embodiment envisions expanding or extending other attributes to the content tags for the control and monitoring of content distribution. For example, such extensions could implement restrictions against file sharing, or place limitations on the exercise of copyrights owned by content originators.

Copyright control tag extensions could mirror the rights that content originators are granted under international copyright and related or neighboring laws. Generally, those rights include the right to (i) reproduce copies; (ii) distribute copies; (iii) prepare derivative works; (iv) publicly perform (in the case primarily of musical works or sound recordings); or (v) publicly display (primarily in the case of pictorial or audio-visual works). Additionally, fields could optionally be included in the tags covering other international, national or local rights affecting the reproduction, distribution, modification or other exploitation of original works. For example, the tag can contain parameters governing user's ability to modify content under European "moral rights" or so-called "droit moral." Certain jurisdictions also allow restrictions on the reproduction, use or modification of databases, particularly customer information databases. All of these rights, and licenses modifying these rights, belonging to content originators can be described by additional fields within the content tags of the present invention. Accordingly, all instructions in content tags can be identified by any authenticated or trusted node in the network including the preferred transporter. Then, any of the nodes interpreting those tags can instruct the preferred transporter to implement transport according to the limitations or strictures indicated in those tags. In one embodiment, a preferred transporter can count copyright protected content as it enters and exits the network. This information can be used, for example, to enforce a "levy" tax that service providers would pay in order to carry peer-to-peer file sharing or broadband services.

A digital signature of a tag or for signature recognition can be computed in any agreed manner but in this example is computed using a cyclic redundancy check (CRC) 32 polynomial with a shared secret (such as a prime number) as a seed value. In this example, CRC enables functional computation of a 1-way authentication value. Once the content tag is authenticated, then variable length Object Identifiers can be used to describe the content application, class, originator, and metadata. Each Object Identifier uses a tag/length/value encoding that is well taught in SNMP Management Information Base and ASN.1 BER (Basic Encoding Rules). Using Object Identifiers allows an arbitrary naming tree to exist to describe the content application, class, type, and originator without having to redefine the tag structure encoding each time a new content application, class, type, or originator is added. Because Object Identifies are machine readable, the Preferred Transporter can keep statistics on each of the unique values it encounters in each of these content tag fields. For example, a Preferred Transport could count statistics for music content from Sony Records, regardless of artist or location. Sony in turn could receive usage reports form various access providers to obtain key usage distribution information from geographically disperse locations and to determine possible carriage fees. It is likely that access providers will become distributors of digital content, committing bandwidth, resources, and access to subscribers in return for carriage distribution fees.

Any time a preferred transporter encounters a content tag, it can use the information indicated by the tag to decode and interpret the content being transported or requested without having to examine deeply into the actual file content or packet transfer. The content originator or the content requestor can assign elements of the tag values depending upon its control of the preferred transport content. In its simplest use, the content tag can be a marker inside an application payload that carries authentication information for preferred transport. In a more robust use, the content tag can identify the originating content, it class and type according to the hierarchy and formats of the content originator. This is important because content names and keywords can be modified but the content tag remains authenticated against the original content descriptors. Content names and keywords can be changed by various users or servers encountering content in the stream of distribution.

Now we explore methods under the present invention for an access provider positively to identify or authenticate transmissions by sending node, and establish preferred transport flows.

In each of these methods, the sending node and the preferred transporter initially "register" with each other, that is, each accept and store the transport parameters which the preferred transporter is to allocate to each relevant transmission type that the sending node transmits. That is, each of these methods assumes that the sending node and the preferred transporter have each stored and are equipped to recognize agreed preferred transport parameters prior to any transmissions. Then, each transmission is preceded by the sending of a signature alerting the preferred transporter to adhere to that prior registered arrangement.

Figure 19:
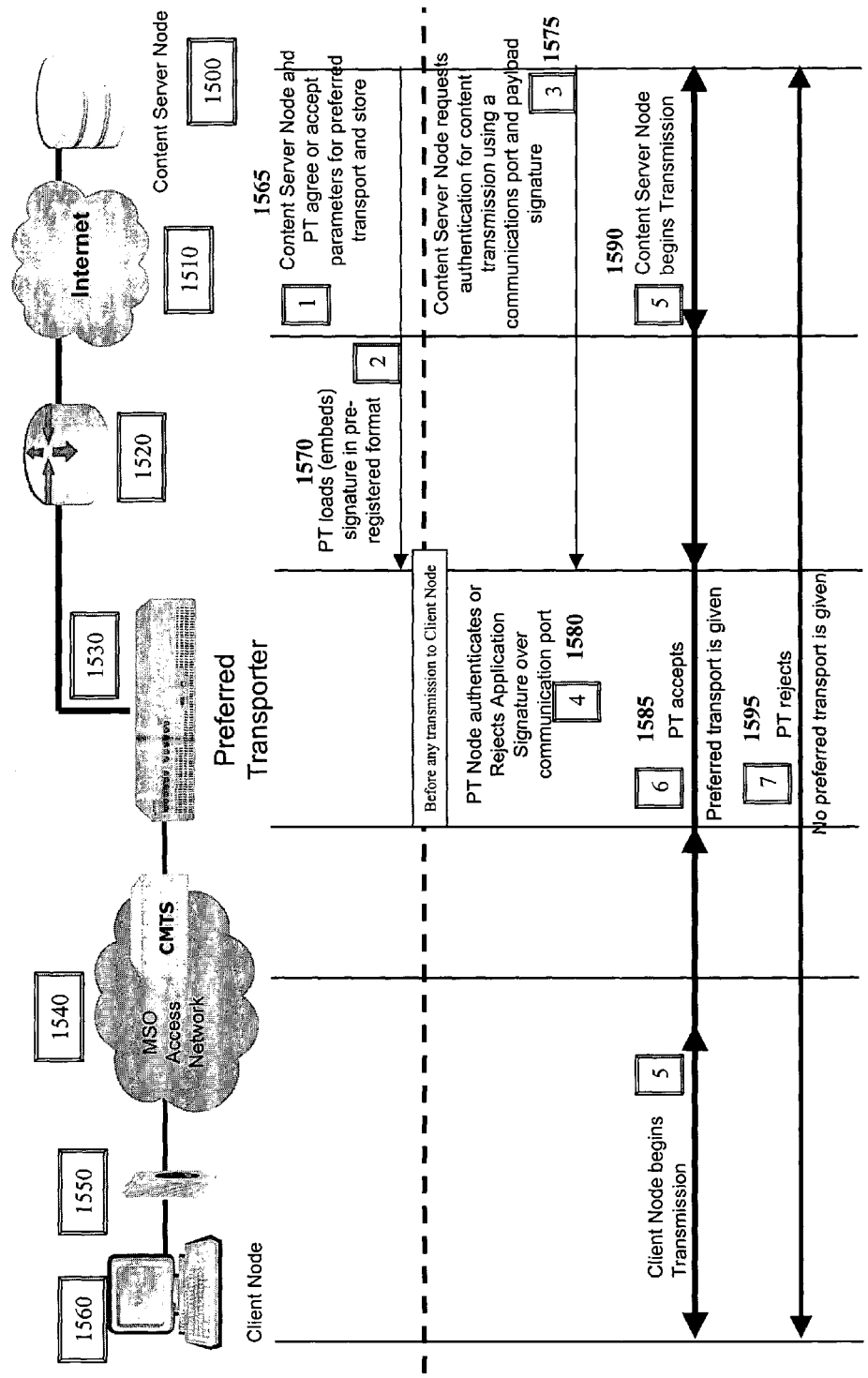
FIG. 19 illustrates a communications and decision flow for validating a node by signature for transmitting content to a client in an access network in accordance with an aspect of the present invention.

FIG. 19 illustrates this registration/signature method. A preferred transport signature affords detailed treatment for communications preference. Also, under this arrangement, different preferred transport parameters may be included in the signature for each individual transmission, instead of every transmission from a given sender or application type being shunted to an identical port for identical treatment.

Parameters that can be made available for inclusion in a preferred transport signature under the present invention include:

Up to subscriber's max bandwidth or up to the maximum transmission speed of the access provider network. For example, a subscriber may be provisioned for 128 Kbps upstream and 384 Kbps downstream as part of the basic service. A preferred transport could increase the transmission speeds above this basic rate for the duration of a preferred content instance.

Query subscriber if higher bandwidth desired. For example, as part of a "pay per view"—type transaction or an on-demand content selection, the subscriber may choose to increase the transmission speeds for the duration of the content delivery. This could enable high quality for a streaming service or a faster download of a large movie file.

Route to alternative delivery for subscriber. For example, an Internet video transmission is routed to the set top box connected to the subscriber's television.

Release date. For example, a studio could pre-distribute content in preparation for a general release date without fear of it being pirated or delivered the "last hope" to the subscribers before the date indicated.

The prior arrangement to be registered by a content server with a preferred transporter in these examples can be according to any number of business or practical arrangements from idiosyncratic to broad industry standard. In one embodiment, both the signature template and the transmission types and parameters are a wholly private arrangement between a single content provider and a broadband access network provider. For example, a provider of on-demand video via public network could make a private arrangement to transport video content to an MSO via the Internet according to a pre-registered signature arrangement. In that example, a preferred transporter would receive and recognize the signature of payloads sent by the on-demand video provider, accord special type of connectivity, and shunt the transmissions to a subscriber's digital set top box attached to her home television rather than to their Internet client computer.

In another embodiment, an industry standard prior registration process and signature format could be established, for example, by an industry standards body formed by any combination of broadband access providers, preferred transport equipment and service vendors, and content companies. In yet another embodiment, a vendor of preferred transport equipment or services could establish a proprietary registration system and signature formats such that any content provider could easily register for preferred transport over broadband access networks using the equipment or service offerings of that preferred transport vendor.

Referring to the network block diagram at the top of each of FIGS. 19-24:

A content server node 1500 is a storage device coupled to a digital network communications device for transmitting items of digital content upon request. Normally, this can be a computer 300 of the type illustrated in FIG. 3, storing and operating a network server or client application such as a media server, an Internet telephony application, an instant messaging program, or any other. In a client-server embodiment, this content server node 1500 can be large-scale streaming media or media download server. Or in a peer-to-peer scenario, this can be any user's computer or a supernode that both receives and stores, and retrieves and sends files according to requests by other peers. In a consumer broadband application, this can be any user's computer operating an application that is registered with the preferred transporter for special treatment. Examples can include Internet telephony, collaboration software, or remote computer access. While these FIGS. 19-24 illustrate node authentication by showing a content server outside of the broadband access network being afforded preferred transport to client nodes inside of that network, the content server node 1500 can also be at a subscriber inside of the broadband access network.

In each of FIGS. 19-24, the content server node 1500 communicates via a wide area network such as the Internet at 1510, interconnected to a broadband access provider's backbone at 1520, routing all transmission requests or alternatively the transmissions themselves through a preferred transporter 1530. When the preferred transporter identifies or authenticates properly registered and signed flows, it transmits them through a broadband access provider's network 1540 to a subscriber's client node 1560 via a broadband modem 1550 coupled to that client node. In one embodiment, the client node 1560 can be or include a computer 300 of the type described in FIG. 3. In other embodiments, the client node 1560 can be or include an IP telephone or videophone, a videogame machine, a television, a personal video recorder, a digital set top box of the type used to receive video-on-demand programming, or other systems.

Figure 20:
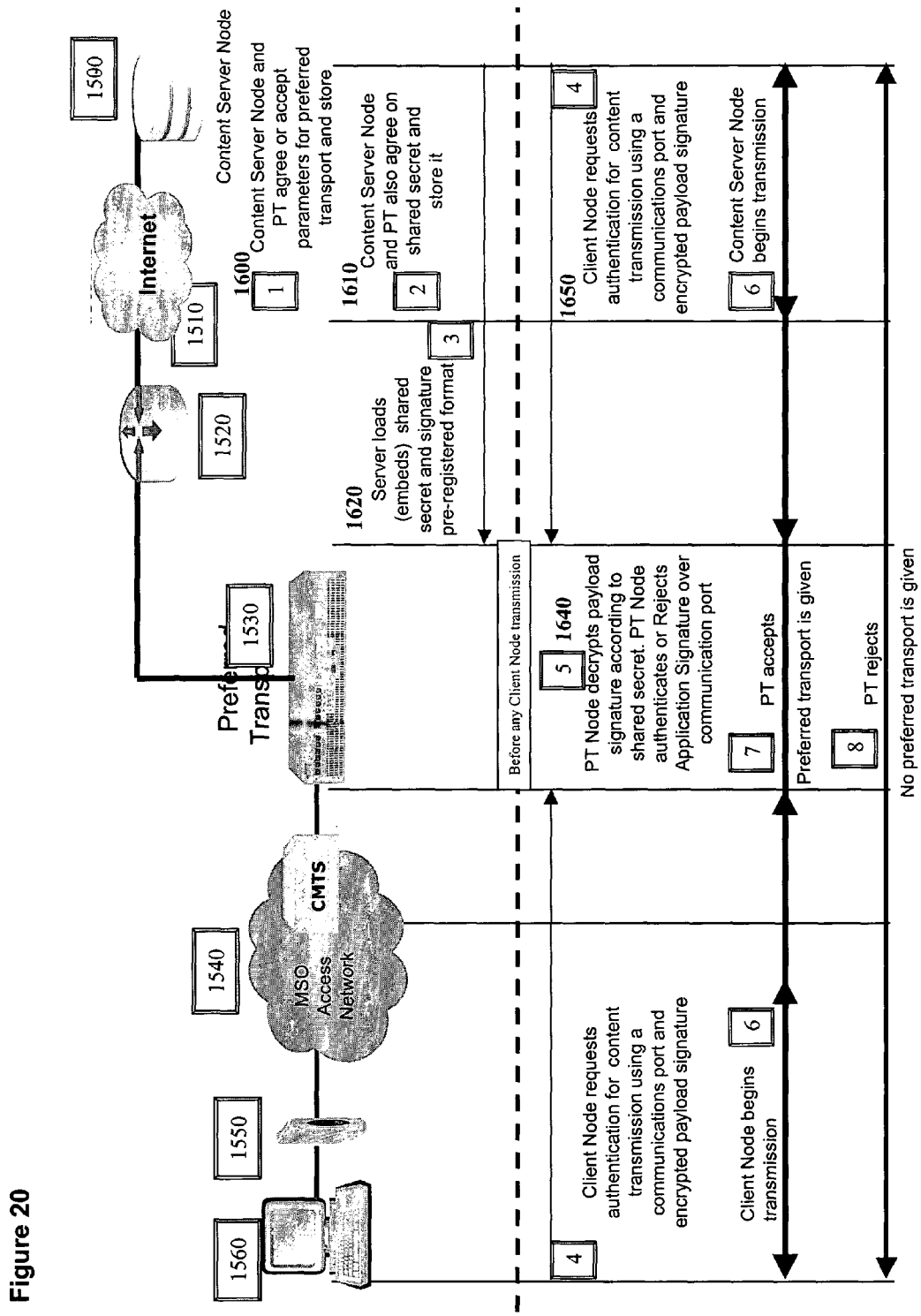
FIG. 20 illustrates a communications and decision flow for validating a node by signature and shared secret for transmitting content to a client in an access network in accordance with an aspect of the present invention.
Figure 21:
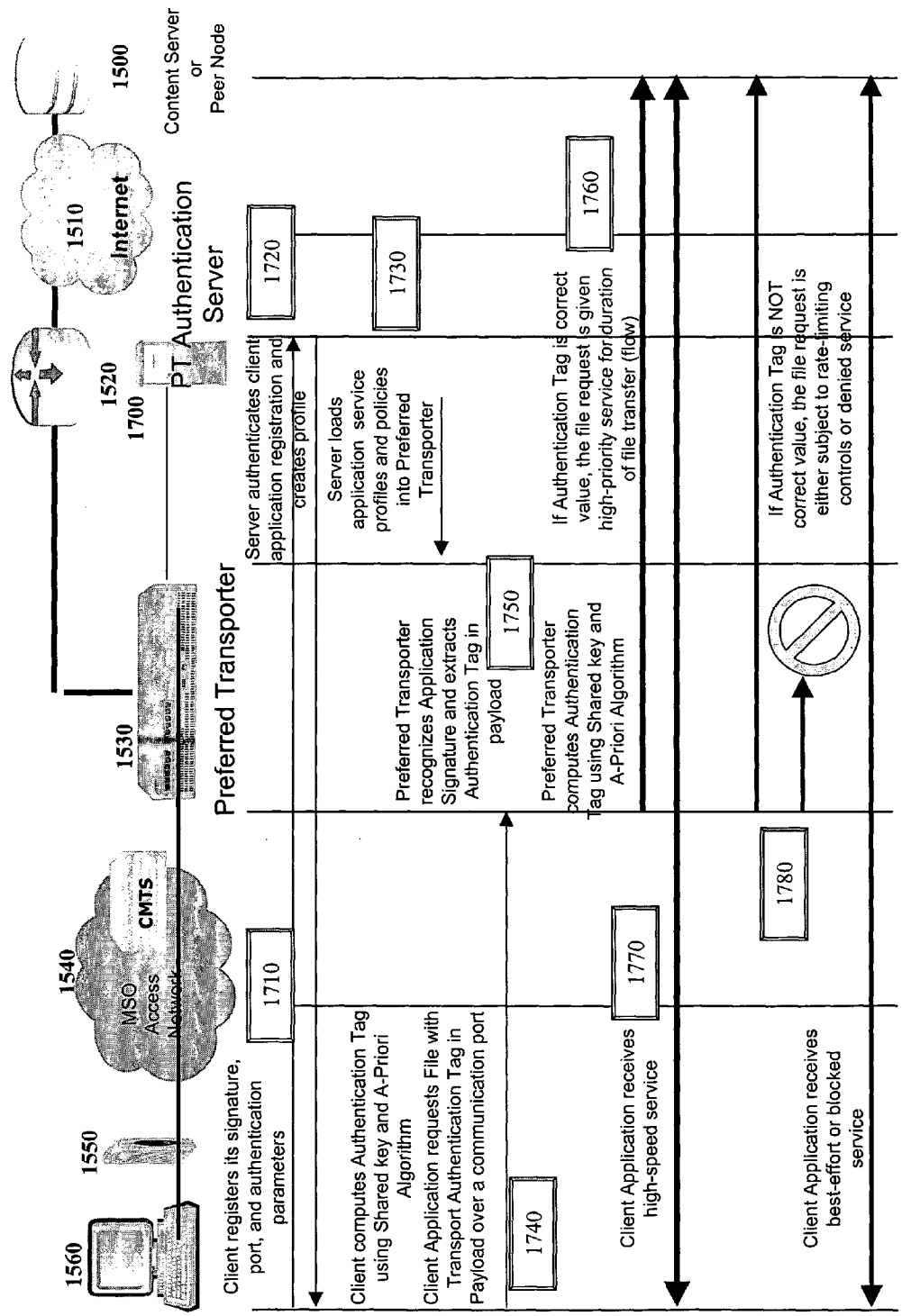
FIG. 21 illustrates a communications and decision flow for validating a node using realtime signaling of one-way authentication messages for transmitting content to a client in an access network under the present invention.

While FIG. 19 illustrates the basic prior registration followed by apriori signatures at each transmission, FIGS. 20 and 21 also illustrate authentication steps to ensure the security of preferred transport resources. Without these steps, any non-participating content server node that is privy to the signature structure of another properly registered content server could, for example, mimic those signatures, and gain preferred treatment at the preferred transporter into the broadband access network.

Turning to the step by step process by which registration, signature, and preferred transport can be executed under a simple embodiment of the present invention, FIG. 19 illustrates a signature only method, where no authentication security steps are taken. At step 1565 the content server node 1500 and the preferred transporter 1530 each store an agreed set of parameters for signature format and eventual treatment of various content or transmission types and classes intending to be sent by the content server.

That signature can include a structured content tag descriptor, such as, for example, the content tag of FIG. 17, that contains machine-readable metadata about the content as well as the content originator and preferred transport service requirements. A content tag structure is a convenient way to implement these descriptors for use in preferred transport because it enables the preferred transporter to identify signatures for preferred transport by inspecting packet payload requests or transmissions for the tag, rather than having to inspect entire packetized payloads in mid-transmission through the access provider's core.

One aspect of a content tag for preferred transport under the present invention allows complex arrangements to be represented in a simple machine-readable tag that can be rebound directly in from of content or can exist separately from the content, perhaps in a request for content or in any other signaling message not directly coupled to the content transmission. For example, that could be a message from a media player requesting that a video stream commence, wherein the video stream itself is not tagged, but that message is tagged to request authenticated preferred transport for the duration of that stream. That "arrangement" can be set by human interaction, or by automated form, with the preferred transporter sending a machine or human actionable registration invitation to new content servers that it encounters.

A content tag, such as the content tag depicted in FIG. 17, can be embedded as part of a client node application signature, inside the content payload header, or associated on a content server as a preferred transport descriptor. In this tag structure, a marker can be used to identify the location of the tag in the packet transmission payload, followed by a length descriptor and a version number. The length can be used to instruct the preferred transporter how many bits in the transmission payload to extract as the content tag. Once the content tag is extracted, it can be inspected and used to affect the transmission, delivery, metering, accounting, and service of the content it describes or represents. In such an embodiment, the tag can contain a version number and reserved fields along with a digital signature used to authenticate its use.

One embodiment envisions the transport tags being appended to a file request using the HTTP protocol. Another envisions the transport tags being advertised in a manner similar to a lease query in the Internet Domain Name Service. Yet another envisions a content tag distribution protocol wherein all Preferred Transport nodes communicate their knowledge of content tags and usage. For example, known in the art is a tag distribution protocol used by Multi-Protocol-Layer-Switches ("MPLS") to associate protocol tags with reserved paths in the network. Such a mechanism could preferably result in a worldwide content distribution system providing preferred transport at the access provider yet leave control of content distribution in the hands of content originators. This embodiment envisions expanding or extending other attributes to the content tags for the control and monitoring of content distribution. For example, such extensions could implement restrictions against file sharing, or place limitations on the exercise of copyrights owned by content originators.

Copyright control tag extensions could mirror the rights that content originators are granted under international copyright and related or neighboring laws. Generally, those rights include the right to (i) reproduce copies; (ii) distribute copies; (iii) prepare derivative works; (iv) publicly perform (in the case primarily of musical works or sound recordings); or (v) publicly display (primarily in the case of pictorial or audiovisual works). Additionally, fields could optionally be included in the tags covering other international, national or local rights affecting the reproduction, distribution, modification or other exploitation of original works. For example, the tag can contain parameters governing user's ability to modify content under European "moral rights" or so-called "droit moral." Certain jurisdictions also allow restrictions on the reproduction, use or modification of databases, particularly customer information databases. All of these rights, and licenses modifying these rights, belonging to content originators can be described by additional fields within the content tags of the present invention. Accordingly, all instructions in content tags can be identified by any authenticated or trusted node in the network including the preferred transporter. Then, any of the nodes interpreting those tags can instruct the preferred transporter to implement transport according to the limitations or strictures indicated in those tags. In one embodiment, a preferred transporter can count copyright protected content as it enters and exits the network. This information can be used, for example, to enforce a "levy" tax that service providers would pay in order to carry peer-to-peer file sharing or broadband services.

A digital signature of a tag or for signature recognition can be computed in any agreed manner but in this example is computed using a cyclic redundancy check (CRC) 32 polynomial with a shared secret (such as a prime number) as a seed value. In this example, CRC enables functional computation of a 1-way authentication value. Once the content tag is authenticated, then variable length Object Identifiers can be used to describe the content application, class, originator, and metadata. Each Object Identifier uses a tag/length/value encoding that is well taught in SNMP Management Information Base and ASN.1 BER (Basic Encoding Rules). Using Object Identifiers allows an arbitrary naming tree to exist to describe the content application, class, type, and originator without having to redefine the tag structure encoding each time a new content application, class, type, or originator is added. Because Object Identifies are machine readable, the Preferred Transporter can keep statistics on each of the unique values it encounters in each of these content tag fields. For example, a Preferred Transport could count statistics for music content from Sony Records, regardless of artist or location. Sony in turn could receive usage reports form various access providers to obtain key usage distribution information from geographically disperse locations and to determine possible carriage fees. It is likely that access providers will become distributors of digital content, committing bandwidth, resources, and access to subscribers in return for carriage distribution fees.

Any time a preferred transporter encounters a content tag, it can use the information indicated by the tag to decode and interpret the content being transported or requested without having to examine deeply into the actual file content or packet transfer. The content originator or the content requestor can assign elements of the tag values depending upon its control of the preferred transport content. In its simplest use, the content tag can be a marker inside an application payload that carries authentication information for preferred transport. In a more robust use, the content tag can identify the originating content, it class and type according to the hierarchy and formats of the content originator. This is important because content names and keywords can be modified but the content tag remains authenticated against the original content descriptors. Content names and keywords can be changed by various users or servers encountering content in the stream of distribution.

Once the content server and preferred transporter agree on signature format and parameters to include in signature, each stores that information at step 1570 for reference each time the content server 1500 initiates a signed content transmission.

To initiate a signed content transmission for preferred transport, at step 1575, content server 1500 can initiate transmission of a signature bearing the transport parameters for a transmission payload. That signature can be sent as a separate preliminary step, or can be coupled to the payload at the beginning of transmission. At step 1580, the preferred transporter 1530 can inspect that signature (whether sent separately or coupled to the payload). That preferred transporter can determine whether the signature is valid. If so, then at step 1585 that preferred transporter either can message that content server or can allow that content server to continue an active transmission so that the transmission can commence or proceed at step 1590, with that preferred transporter adhering to the transport means indicated by the values inspected in the signature.

If the signature is not valid, or if no signature is present, then the preferred transporter can reject the payload for preferred transport at step 1595. The result is that the preferred transporter would not accord that payload preferred transport. As an example, here are some of the types of transport that a preferred transporter may accord a non-signed payload, or a payload with a rejected signature:

Do not transmit. This prevents any content distribution from occurring on the inspected communication port.

Transmit according to default, non-preferred parameters. Allows content distribution but with no preference.

Send client node 1560 or content server node 1500 an opportunity to send that payload using preferred transport.

Send client node 1560 or content server node 1500 an opportunity to send payloads of that type, class, origin, or all payloads from that sender with preferred transport. This request may or may not require either of those nodes to pay or give other consideration in the bargain.

Figure 19A:
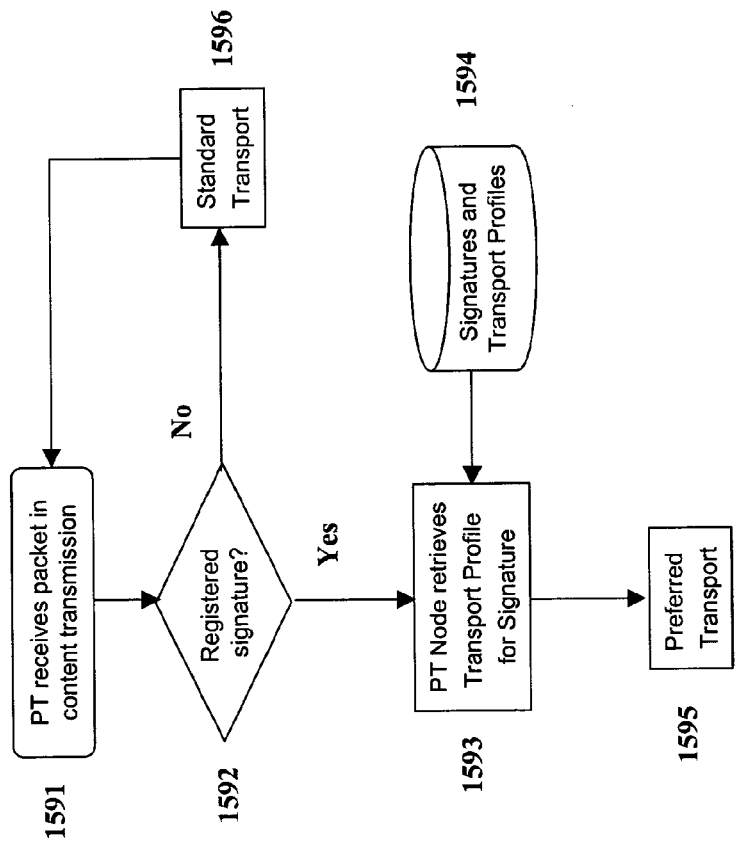
FIG. 19a is a flow chart depicting a method for preferred transport.

FIG. 19a is a flow chart depicting a preferred transporter method for providing preferred transport in accordance with FIG. 19. The preferred transporter receives a packet in content transmission 1591 and determines whether the signature is registered 1592. If the signature is not registered, the packet will be accorded standard transport 1596. If the signature is registered, the preferred transporter retrieves the transport profile 1593, for example, from a database of signatures and transport profiles 1594. The packet is then accorded preferred transport 1595 according to the transport profile.

FIG. 20 adds the element of security to a registration and signature process, by use of a one-way transmission and verification of a shared secret. In one embodiment, a cyclical redundancy check (CRC) method of using a shared secret is used for one-way authentication. Any number of other methods of one-way cryptography are also available in the art to protect the privileged status of the contents of a payload signature. The steps are similar to those of FIG. 19, except that a shared secret is introduced into the agreed parameters, and used to encrypt the signature itself. As long as the shared secret is kept secure, such signature encryption method is designed to prevent a non-registered content server from using a signature configured as though it were registered, and spoofing the preferred transporter into wrongfully according a payload preferred transport.

Figure 20A:
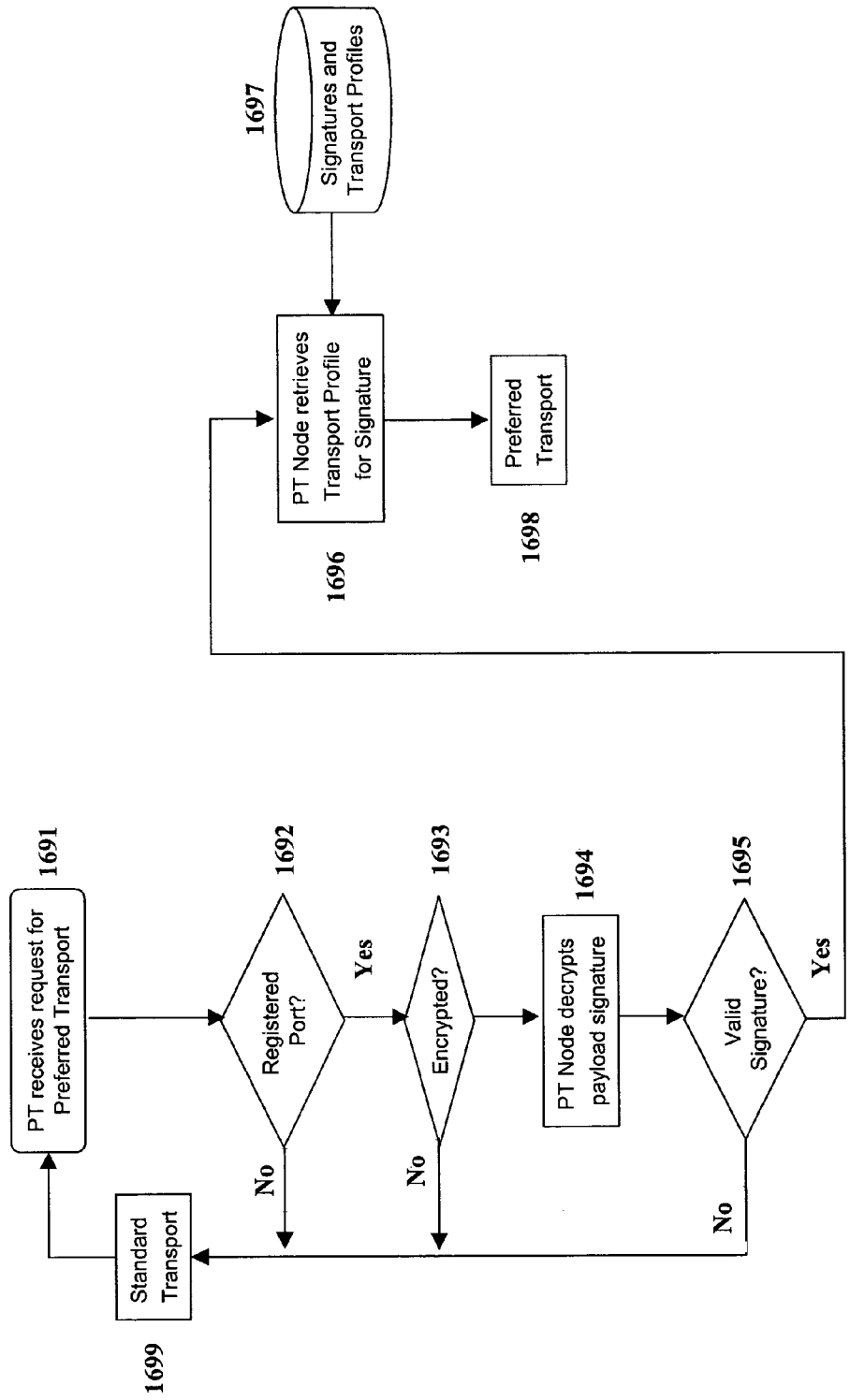
FIG. 20a is a flow chart depicting a method for preferred transport.

FIG. 20a is a flowchart depicting a preferred transporter method for providing preferred transport in accordance with FIG. 20. The preferred transporter receives a request for preferred transport 1691 and determines whether the port is registered 1692. If the port is not registered, a packet will be accorded standard transport 1699. If the port is registered, the preferred transporter determines whether the packet is encrypted 1693. If the packet is not encrypted, the packet will be accorded standard transport 1699. If the packet is encrypted, the preferred transporter decrypts the payload signature and determines whether the signature is valid 1695. If the signature is not valid, the packet is accorded standard transport 1699. If the signature is valid, the preferred transporter retrieves the transport profile for the signature 1696, for example, from a database of signatures and transport profiles 1697. The packet is then accorded preferred transport 1698 according to the transport profile.

An example will further illustrate the mechanics of a client application registering its signature and tag authentication type. Being able to register a signature and authentication type allows an application dynamically to associate preferred transport with certain application and content requests. By way of example, let us assume that Client Node 1560 is used by a subscriber for peer to peer file sharing. One of the peer to peer applications provides access to authorized copyrighted content which is digitally signed and shared amongst the server nodes within a peer to peer network. Content Server 1500 in this case is actually a peer node or a peer supemode as explained above, which stores such authorized, digitally signed copyrighted files and makes them available for authorized downloads. Further assume that this peer to peer application supports content tags under the present invention that are readable by a Preferred Transporter 1530 in the access provider network.

In this example, as is increasingly the case in the broadband access network field, the access network operator in its service agreement with every subscriber prohibits the use of peer to peer applications for the transfer of unauthorized or pirated content. The one exception are certain peer to peer networks to the extent that they offer content files that are tagged as authorized under the content tag structure honored by that access provider's preferred transporter 1530. For tagged, authenticated files, the broadband access providers actually offers preferred transport in exchange for one time transport fees per download or additional monthly service fees paid by the subscriber.

Referring to FIG. 21, the subscriber at Client Node 1560 downloads and installs a peer to peer file sharing application that interoperates with the content tag system of the access provider's preferred transporter 1530. This is the latest revision of application code. Upon installation, the file sharing application registers itself with the Preferred Transport 1530 node by way of the Preferred Transport's Authentication Server 1700 as shown in step 1710.

The Authentication Server 1700 can authenticate the application and stores the signature and authentication parameters by creating a profile and then loading the profile in to the Preferred Transporter 1530 as shown in step 1730. Those parameters can include instructions for authenticating content transmission to or from that peer application. Examples of those parameters include without limitation, URLs of any authentication servers, application OID, tag parameters or locations of authentication values stored within tags, private or public keys if the authentication is to be by two-way key exchange, cryptograms if the authentication is to be by one way encryption using a shared secret stored at the Preferred Transporter 1530 and the Authentication Server 1700, or any other type of parameters required by any communications node to perform authentication of content for preferred transport. Note that the shared secret can be unique to each instance of the application. Also note that once an application has itself been authenticated to an authentication server by any means including for example username and password, then the shared secret can be restricted from the client and known only to the Preferred Transporter 1530 and the Authentication Server 1700. In any event, desired is a means of establishing an authenticated communications path among the client application at client node 1560, the Preferred Transporter 1530 and the Authentication Server 1700 such that system is not vulnerable to attack at the client level. Therefore optimally, the client application at client node 1560 would store no unchanging secret key information.

Now the Client Node 1560 peer to peer application can request content from a Peer Node 1500 using that application's registered signature and authenticated tag as shown in step 1740. The Preferred Transporter can recognize the application signature and extract the content tag to compute the authenticated value using a shared secret and the registered information as shown in step 1750. If the authentication is successful, then the Preferred Transporter can provide preferred transport services for the duration of the content flow as shown in step 1760 with the client application able to receive peer to peer shared files as shown in step 1770 otherwise the sharing is blocked as shown in step 1780.

Figure 21A:
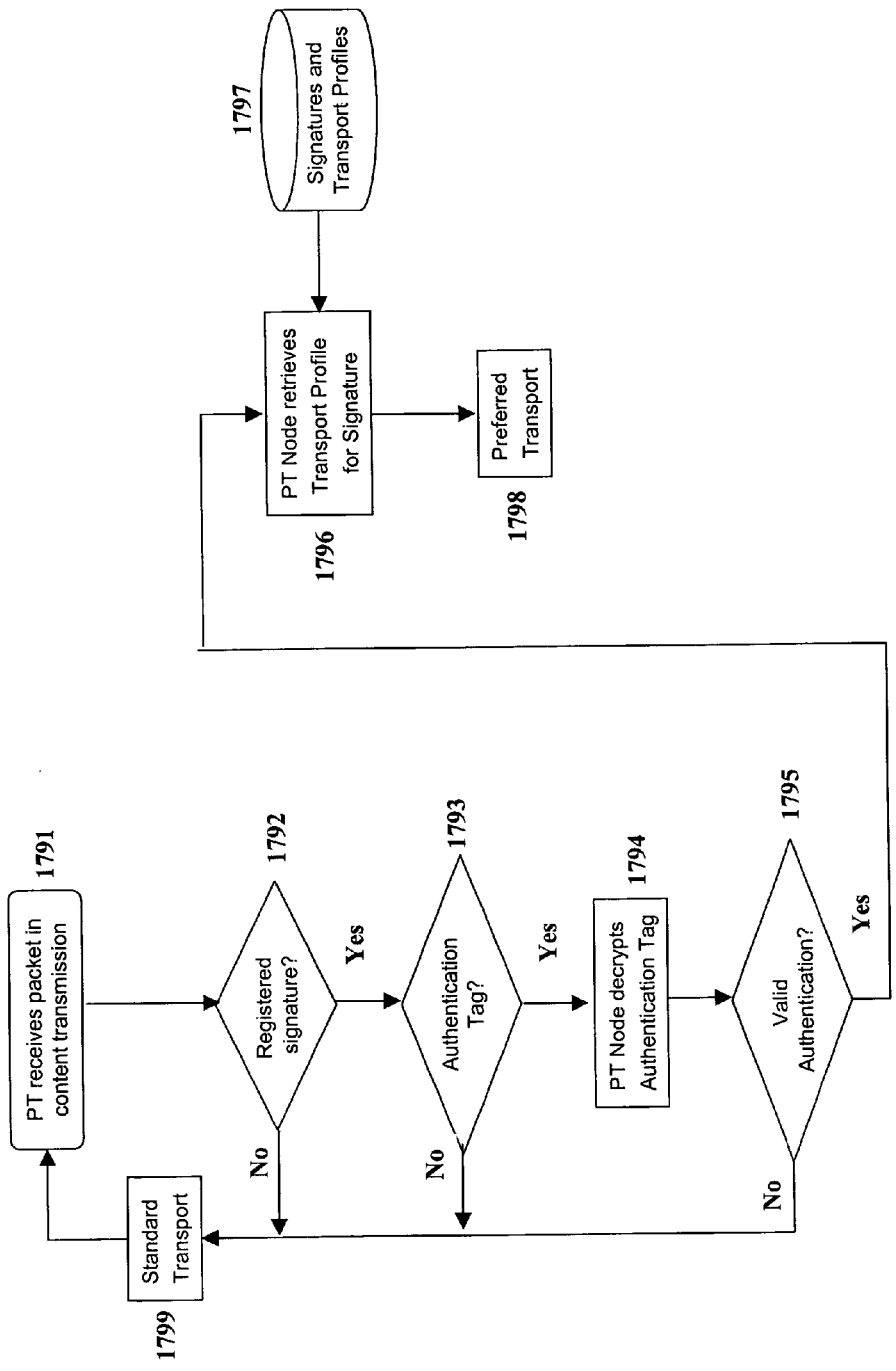
FIG. 21a is a flow chart depicting a method for preferred transport.

FIG. 21a is a flowchart depicting a preferred transporter method for providing preferred transport in accordance FIG. 21. The preferred transporter receives a packet in content transmission 1791 and determines whether the signature is registered 1792. If the signature is not registered, the packet will be accorded standard transport 1799. If the signature is registered, the preferred transporter determines whether the packet contains an authentication tag 1793. If the packet does not contain an authentication tag, the packet will be accorded standard transport 1799. If the packet does contain an authentication tag, the preferred transporter decrypts the authentication tag and determines whether the authentication is valid 1795. If the authentication is not valid, the packet is accorded standard transport 1799. If the authentication is valid, the preferred transporter retrieves the transport profile 1796, for example, from a database of signatures and transport profiles 1797. The packet is then accorded preferred transport 1798 according to the transport profile.

There may be times when it will be more effective to practice the present invention by having an application at the client node 1560 actually carry out the authentication for preferred transport of content from a content server node 1500. One example of this is when a client node is used for two way communications service like Internet telephony, or multiplayer gaming. In those cases, the subscriber's own client node 1560 may actually be the content sending node, or may function as both a content sending node and a client node. Another example of a client node also being a content server node is when a client node is operating a peer to peer content distribution application. And generally, for those and almost any other transmission situation, a network access provider may reduce the burden on its facility by deferring the preferred transport authentication role to an application running at the client node. Such an embodiment of the present invention is available to reduce computational and traffic burdens placed on a central preferred transporter. That outsourcing is achieved by having the preferred transport signatures or tags sent by the client when requesting the download, rather than unpacking it from the payload itself in mid transmission.

Figure 22:
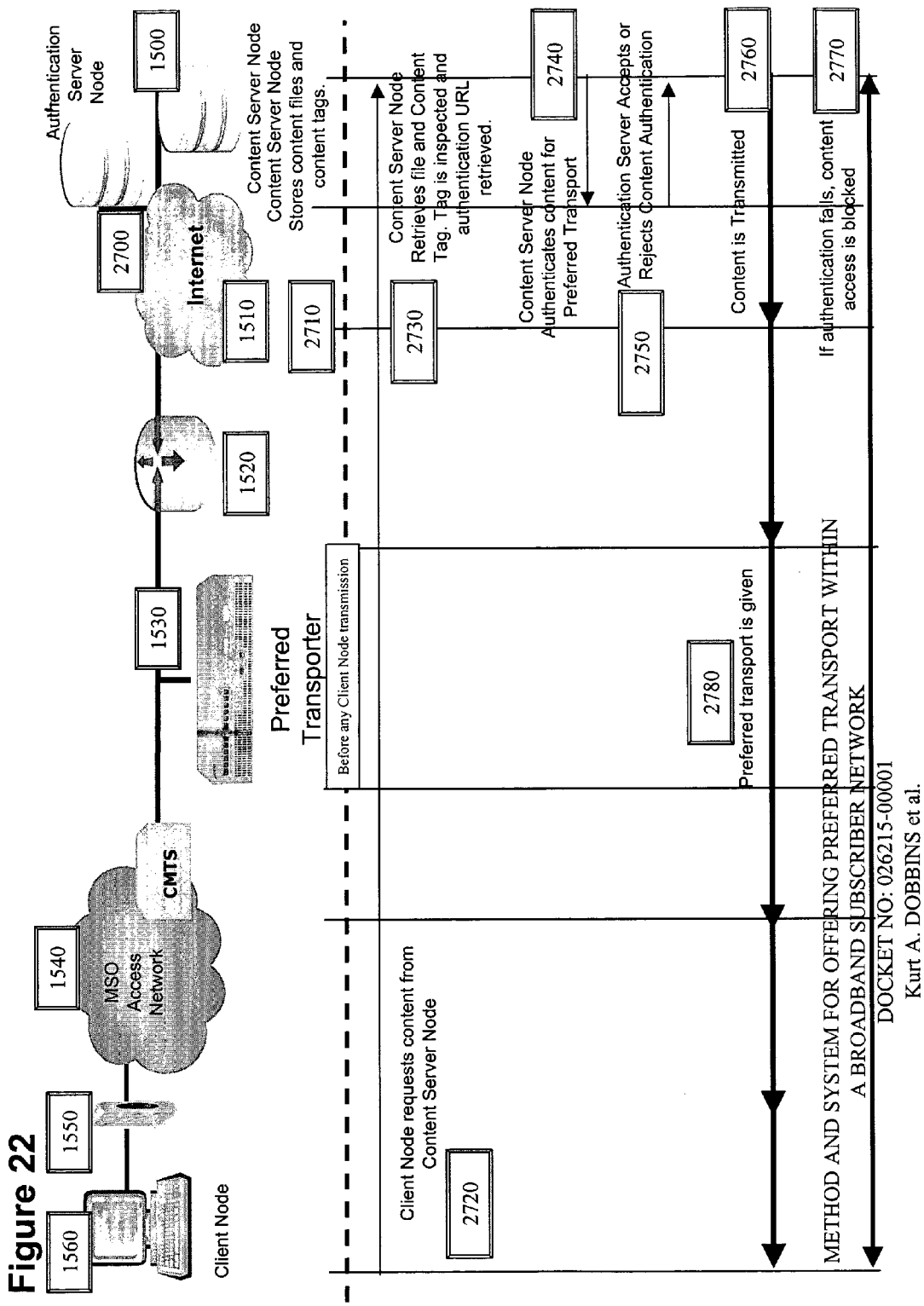
FIG. 22 illustrates a communications and decision flow for authenticating an item of content for preferred transport, wherein a content sending server identifies and interprets a instructions coupled to an item of content, and instructs a preferred transporter to carry the content transmission accordingly.

FIG. 22 illustrates such a process. Note that the illustrated embodiment is a hybrid of a node-specific authentication for preferred transport and a content specific process. This process is node-specific in the sense that it is an identification and authentication process available only to a client node within the broadband access network. But in the sense that the preferred transporter and the broadband access network provider controls all network access afforded to these nodes, this identification and authentication scheme can be used for all broadband content requests from that client on an apriori basis. Therefore this figure describes the process by referencing use of a content tag as described in the node-agnostic/content-specific embodiment of the following section.

Figure 22A:
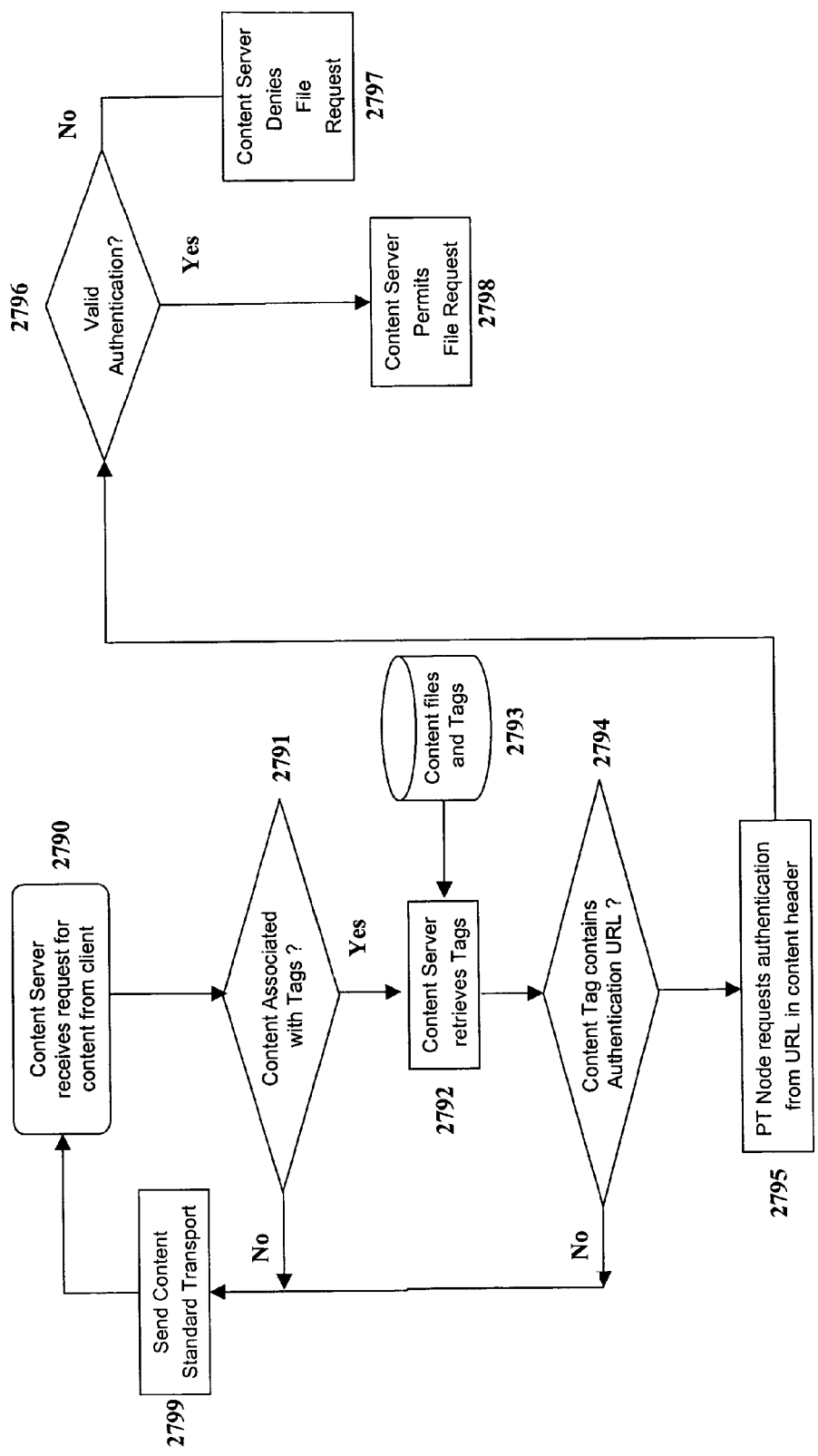
FIG. 22a is a flow chart depicting a method for preferred transport.

FIG. 22a is a flowchart depicting a method for providing preferred transport in accordance with FIG. 22. The content server receives request for content from a client 2790 and determines whether the content is associated with tags 2791. If the content is not associated with one or more tags, the content will be accorded standard transport 2799. If the content is associated with one or more tags, the content server retrieves the tags, for example, from a database of content files and tags 2793. The content server then determines whether the content tag contains an authentication URL 2794. If the content tag does not contain an authentication URL, the content will be accorded standard transport 2799. If the content tag does contain an authentication URL, the preferred transporter requests authentication from the authentication URL 2795 and determines whether the authentication is valid 2796. If the authentication is valid, the content server permits the file request 2798. If the authentication is not valid, the content server denies the file request 2797.

The process of FIG. 23 also refers to a client application being present in the client node 1560. This can be an application placed at all client nodes by the broadband access provider itself in order to distribute the task of authenticating content for preferred transport. Alternatively, it can be an application created by a participating software provider such as an Internet telephone or videoconference service, a multi-party gaming service, or even a peer to peer authorized content distribution network. This function of authenticating for preferred transport by the participating access provider could be included in virtually any network client application that is intended to receive preferred transport by the access provider. Conversely, this function could be included in all versions of an Internet client application such as a peer to peer application. Only access providers running preferred transporters configured under the present invention to carry out the authentication and preferred transport steps would utilize the authentication or transport tags transmitted by that function at the client node level. Preferably such a function would be appended to the Internet application in such a way as not to adversely impact the application's size or functionality.

At step 2610, a content server (or another communications client) can be ready to send certain content upon request. At step 2620, before sending any transmission requests, the client application at client 1560 and the preferred transporter 1530 might agree on signature or tag formats, preferred transport parameters for content or transmission classes and types, and on any one-way shared secret, or dynamic real time authentication processes or authentication URLs that must be consulted for each transmission. Normally, in a situation when many clients within the access network are running the same application, this might only entail the application at client node 1560 registering with the preferred transporter 1530 for a set of those parameters already stored at the preferred transporter 1530.

Step 2620 is the client's request for a download or communication with the content server 1500. One efficiency offered by this embodiment of the present invention is that the content signature or content tag may be offered to the preferred transporter in a separate step from the content transmission itself. This approach might spare preferred transporter the complexity of stripping a signature or tag from the content payload itself, or even interrupting a transmission flow while any authentication is carried out. In the case of most broadband content requests, this request could be phrased as an HTTP GET request command. So even in the absence of any other signaling to alert the preferred transporter of a preferred transport request, the preferred transporter can inspect HTTP GET request commands sent by the participating applications at participating subscribers and inspect that line for content tags or instructions. It is envisioned that a content tag could also be inserted in the response to the HTTP GET request. In some cases, it may be desirable to identify the returning path for preferred content in cases of asymmetrical routing.

The participating application at client node 1560 sends such a request at step 2630. At step 2640, the preferred transporter 1530 inspects the tag, carrying out any authentication steps that are indicated within that tag, accepting or rejecting preferred transport accordingly at 2650 and 2660. So the preferred transport levels are fixed at the time that the content is requested. Then from the outset, the preferred transporter establishes the flow of the requested transmission according to the agreed and authenticated parameters.

Figure 23A:
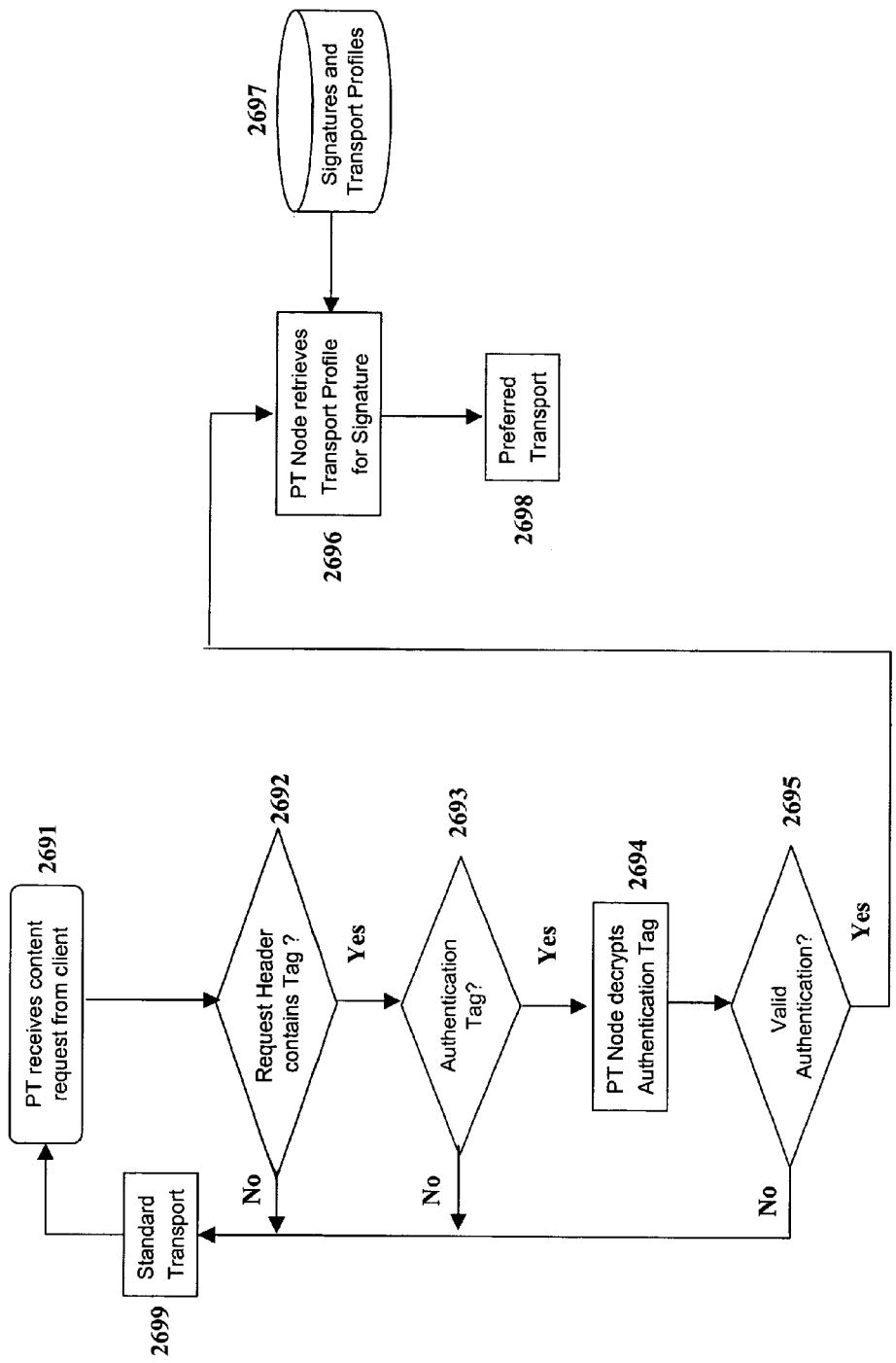
FIG. 23a is a flow chart depicting a method for preferred transport.

FIG. 23a is a flowchart depicting a method for providing preferred transport in accordance with FIG. 23. The preferred transporter receives request for content from a client 2691 and determines whether the request header contains a tag 2692. If the request header does not contain a tag, the content will be accorded standard transport 2699. If the request header contains a tag, the preferred transporter then determines whether the tag includes an authentication tag 2693. If the tag does not include an authentication tag, the content will be accorded standard transport 2699. If the content tag does include an authentication tag, the preferred transporter decrypts the authentication tag 2694 and determines whether the authentication is valid 2695. If the authentication is not valid, the content is accorded standard transport 2699. If the authentication is valid, the preferred transporter retrieves the transfer profile for the signature 2696, for example, from a database of signatures and transport profiles 2697. The content is then accorded preferred transport 2698.

One embodiment of the invention provides for sending-node-agnostic authentication of tagged content for preferred transport. This functionality will now be described with reference to FIGS. 22 and 24.

Very often as content files begin to circulate among users of the Internet, they are transmitted by any number of transmission nodes that may or may not be controlled or related to their originator. For example, a single audio or visual file, even if it is properly protected against copying by digital rights management systems (like that offered by RealPlayer or Microsoft Media Player 9) will largely not actually be distributed by its originator. For example, the originator of a digitally protected song or video may first offer the file from download from its own server. In this scenario, a registration scheme for node-specific identification of content for preferred transport is adequate, since a special arrangement can be registered between that content server and any relevant preferred transporter.

However, as the file becomes popular, it may end up being distributed by any number of means over the Internet. Users may share the file using peer to peer networks. They may e-mail or FTP it to each other. Different fan websites may post it for download. Even access and network providers may cache the file so that subscribers can download it without taxing the network's Internet backbone too heavily. In any of those redistribution scenarios, a preferred transport registration and identification system that works only with the original content server will not recognize the file for preferred transport.

A content-specific/node-agnostic embodiment of the present invention addresses this issue by offering different exemplary means of tagging a file itself for preferred transport. The tag can be coupled to the file in such a way as to be inseparable from it, instructing redistributors or preferred transporters in mid-transmission to accord the file preferred transport. Known in the art are methods of encrypting or protecting content files with so-called "digital rights management" to prevent unauthorized reproduction of copyrighted files. Those prior art DRM systems were limited to allowing originators to control only the manner in which their original content files were reproduced. Under the present invention, those same types of content protection tools can be used to insert tags (either encrypted or not) into content files to prevent or manage unauthorized distribution. Those same transport tags under the present invention may be used in other cases to encourage preferred transport or distribution of the content files. Either way, by marking the content when it is originated or DRM "wrapped," with the information needed by a preferred transporter, the present invention offers an originator of content to control not only the means by which that content is reproduced, but the means by which it is distributed.

Generally, two different approaches to interpreting and enforcing node-agnostic content distribution possible can be explained. First, a content server used for content redistribution can inspect a standard tag for authentication and preferred transport instructions. The content server would be the one to authenticate the content, preferably by real-time communications with an authentication server whose address is indicated by the content tag. Once authenticated, the content server could transmit it to the preferred transporter and the subscriber via a broadband access network (See FIG. 22), using any of the previously described node-specific methods. A content server node may be in a better network location to provide the preferred transport authentication in cases where the server is connected via a private circuit, a tunneling mechanism, or physically closest to the subscriber in the case of a content server cache.

Figure 24:
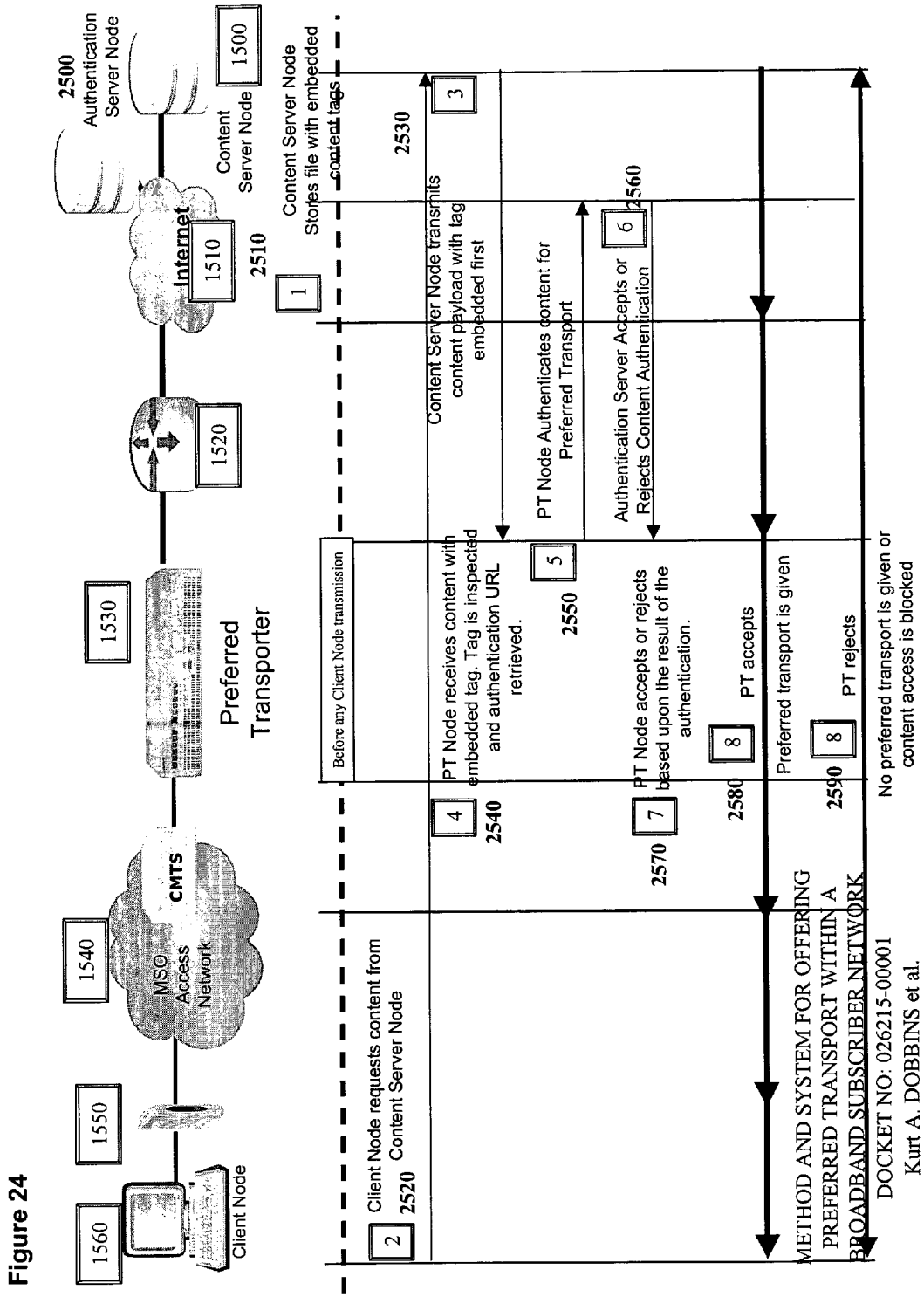
FIG. 24 illustrates a communications and decision flow for authenticating an item of content for preferred transport, wherein a preferred transporter identifies, interprets and executes instructions in mid-transmission according to a tag coupled to an item of content.

Second, a preferred transporter itself can inspect each payload before commencing a flow to a subscriber for content tags (See FIG. 24). Inspecting the content tag, the preferred transporter would send a real-time authentication request to any authentication server indicated in the tag, and if valid will flow the file to the subscriber based on the transport parameters indicated by the tag.

In the same way Internet nodes provide hop-by-hop transport through a public and private network, content transport tags can be used to enable content distribution control over both public and private networks. A content tag could include scope or geographic restrictions. Secure content could be restricted not to exit a private network, or perhaps not lease the domestic territory. One embodiment of the tag could add a hop-count, use-count, or geographical constraint (inclusive, exclusive, or explicitly listed) descriptors, which could control the distribution of an individual content once it leaves the originating server. For example, a content tag could contain additional attributes restricting content distribution. That restriction could limit distribution based on attributes including but not limited to physical location, geographic location, receiving applications, certain subscriber networks, certain subscribers, certain groups of subscribers or payment.

An example will further illustrate the mechanics of a preferred transporter first authenticating an item of content for transmission, and then provisioning preferred transport according to an arrangement between the network access provider and an entity that originated or owns the content, but which may not be related to the content server now transmitting that content. There are any number of ways of establishing this arrangement between the network access provider and the content originator, either through human interaction, or various levels of automated or computer-negotiated arrangements. But assume that the arrangement of this example is reached by a cable operator entering into a business arrangement to provide preferred transport for all content being served from a particular content originator, such as a movie studio originating movies for download through a variety of online download services, or with a peer to peer network planned for legal content.

In FIG. 22, the Client Node 1560 is a subscriber-operated computer requesting content from a Content Server Node 1500 hosting the movie downloads. The Content Server Node 1500 hosts a variety of video content files from different content originators, such as movie studios and sports entertainment. Not all video streams require preferred transport nor are all content originators willing to share revenues of video content with an access provider in order to receive preferred transport services of content. Consider for illustration that some content downloads will be authenticated for preferred transport and others will not.

The client node 1560 is connected to MSO broadband access network 1540 of a cable company. The cable infrastructure provides broadband Internet high-speed data service through a cable modem 1550 which is connected via the MSO's cable lines to a separate Cable Modem Termination System in 1540. The cable termination systems convert the cable infrastructure data payload to IP based packet services for transport over the Internet 1510 through an Internet access router 1520 on the client's broadband access network. The Internet 1500 may be made up of multiple public networks or may be a private backbone of the service provider. This MSO broadband access provider may have imposed bandwidth restrictions on content downloads preventing broadcast quality, or fast download service unless the transmission is authenticated with a business contractor of the cable operator. Let us further assume that the cable operator and a movie studio have entered in to a business relationship to provide preferred transport of movies originated at that studio to subscribers on the cable operator network. In this example, assume that the content server 1500 connected to the Internet 1510 is not affiliated and has no arrangement with the MSO, but does carry movie files originated by the movie studio, and tagged for preferred transport by participating broadband access networks. As a condition for carrying its movie files, the movie studio in this example requires that this Content Server Node 1500 be equipped to retrieve, interpret and act upon content preferred transport tags under the present invention.

The Content Server Node 1500 stores content files and the associated content tags for preferred transport as shown at step 2710. The subscriber at Client Node 2788 requests content from the Content Server Node as shown in step 2720. The Content Server Node 1500 retrieves the content along with its associated tag and inspects the tag for authentication at step 2730. The Content Server Node 1500 uses an Authentication URL contained in the content tag to perform authentication to an external Authentication Server Node 2700 associated with the content as shown at steps 2740 and 2750. Presumably, that authentication server 2700 is maintained by the movie studio as a means to control, monitor, and account for distribution of its movies via participating broadband access networks.

If authentication is successful, then the content tag may be removed from its association or binding with the content file. Following successful authentication, the Content Server Node 1500 transmits the content and instructs the Preferred Transporter 1530 to give the content preferred transport. That preferred transporter 1530 could accept that instruction either based upon a prior trust relationship that the MSO owning the preferred transporter made with that content server 1500, or due to an instruction by the MSO's movie studio partner to accept preferred transport instructions from that content server node 1500. For added security, authentication can also be executed between the preferred transporter node 1530 and that content server node 1500 employing any authentication method including those previously discussed in this specification.

Figure 24A:
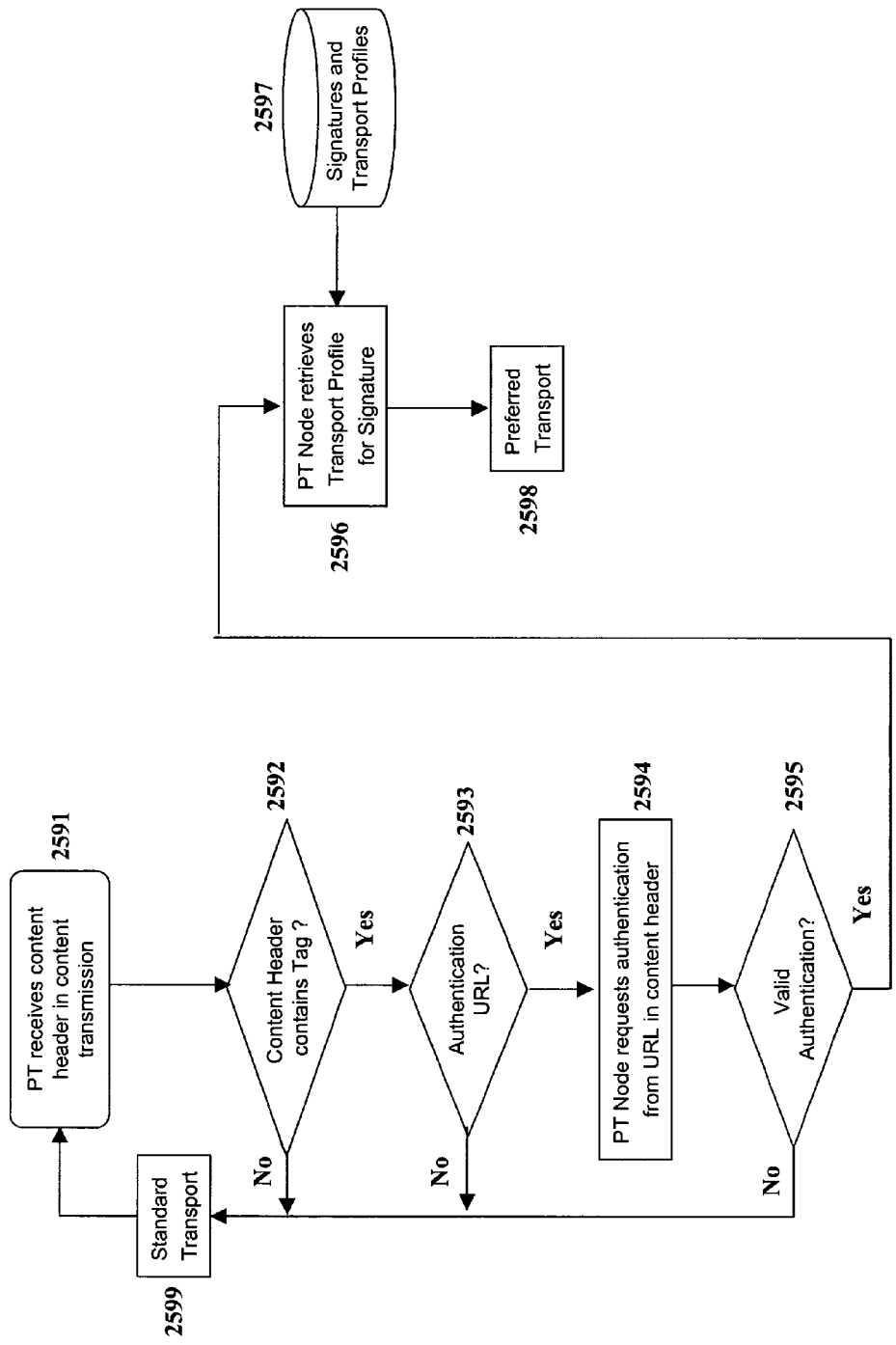
FIG. 24a is a flow chart depicting a method for preferred transport.

FIG. 24*a* is a flowchart depicting a method for providing preferred transport in accordance with FIG. 24. The preferred transporter receives a content header in content transmission 2591 and determines whether the content header contains a tag 2592. If the content header does not contain a tag, the content will be accorded standard transport 2599. If the content header contains a tag, the preferred transporter then determines whether the tag includes an authentication URL 2593. If the tag does not include an authentication URL, the content will be accorded standard transport 2599. If the content tag does include an authentication tag, the preferred transporter requests authentication from the authentication URL 2594 and determines whether the authentication is valid 2595. If the authentication is not valid, the content is accorded standard transport 2599. If the authentication is valid, the preferred transporter retrieves the transfer profile for the signature 2596, for example, from a database of signatures and transport profiles 2597. The content is then accorded preferred transport 2598.

Figure 25:
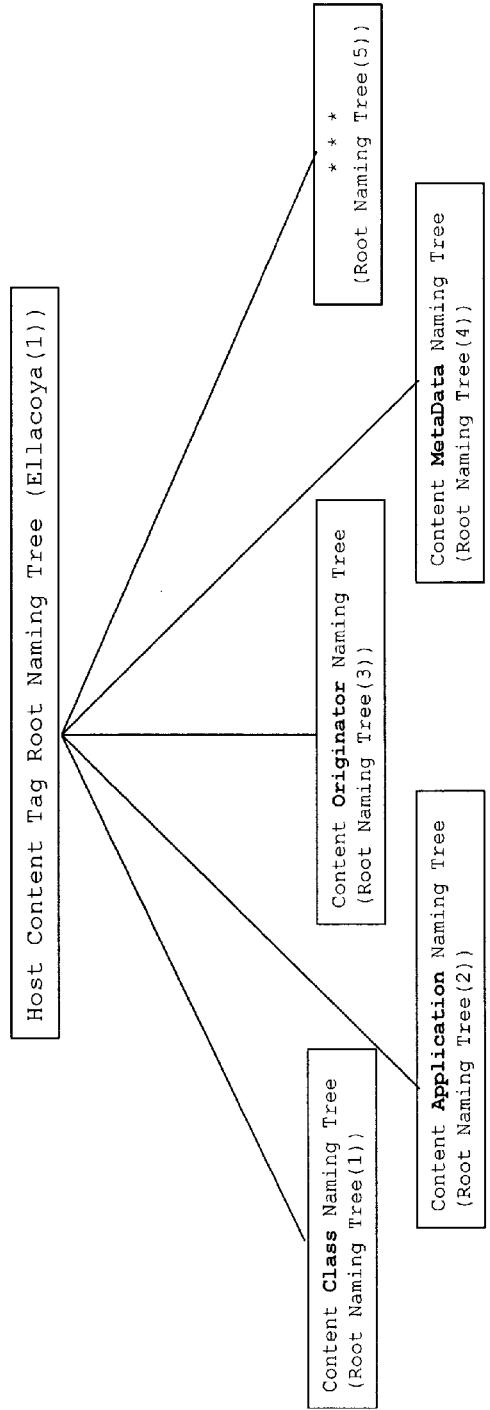
FIG. 25 illustrates an exemplary root naming tree for content authentication tags under the present invention.

FIG. 25 illustrates a content tag root naming tree in accordance with one aspect of the present invention. Such a contact tag root naming tree could be used, for example, to in creating the OID fields 190, 192, 194, 196 of FIG. 18.

Figure 26:
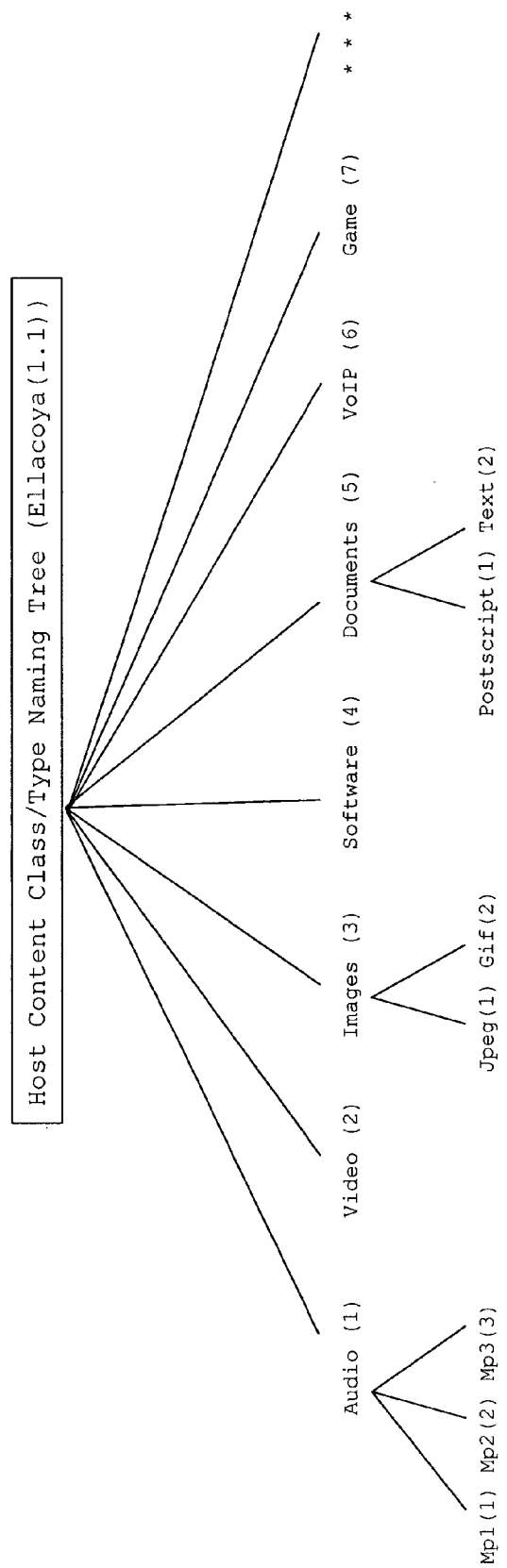
FIG. 26 illustrates an exemplary content authentication tag naming tree for a content class or type subordinate naming tree under the present invention.

FIG. 26 illustrates a content class/type naming tree in accordance with one aspect of the present invention. Such a content class/type naming tree could be used, for example, to in creating the content class/type field 190 of FIG. 18.

Figure 27:
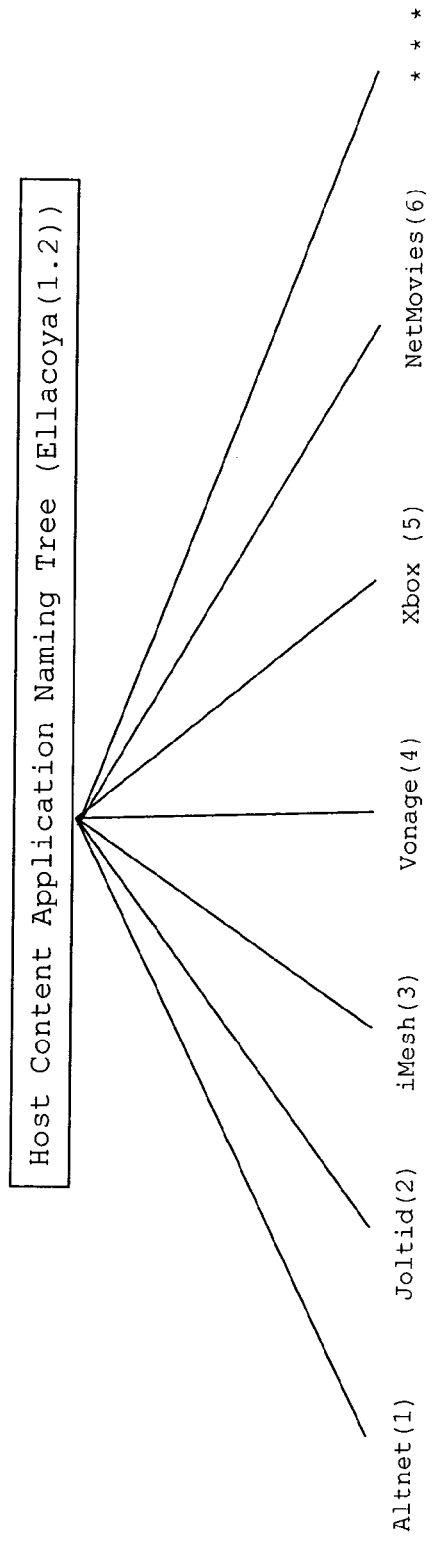
FIG. 27 illustrates an exemplary content authentication tag naming tree for a content application subordinate naming tree under the present invention.

FIG. 27 illustrates a content application naming tree in accordance with one aspect of the present invention. Such a content application naming tree could be used, for example, to in creating the content application field 192 of FIG. 18.

Figure 28:
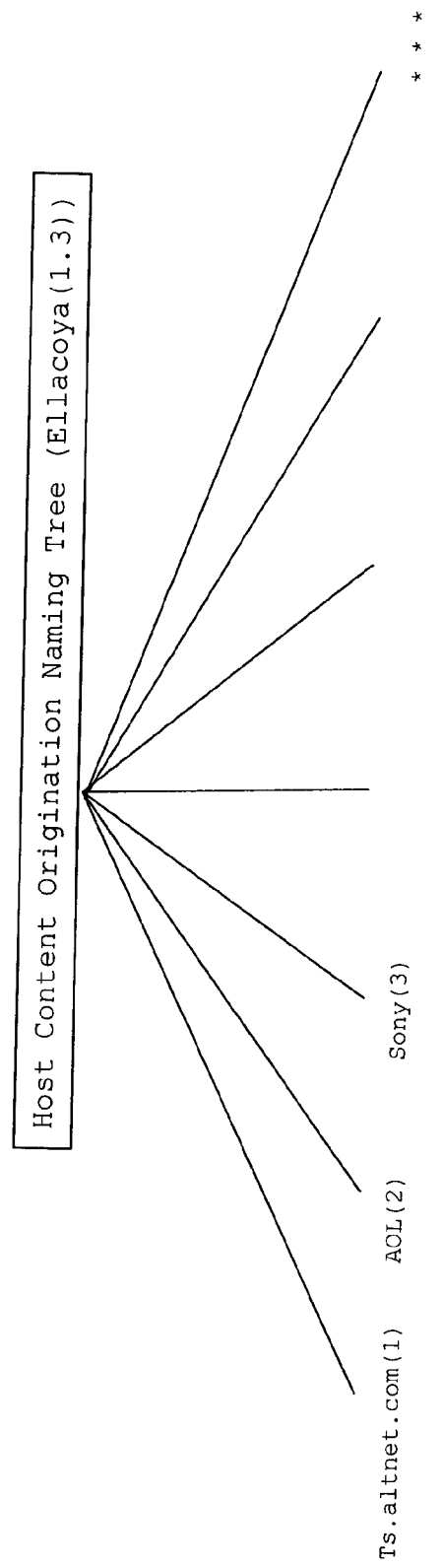
FIG. 28 illustrates an exemplary content authentication tag naming tree for a content origin subordinate naming tree under the present invention.

FIG. 28 illustrates a content origination naming tree in accordance with one aspect of the present invention. Such a content origination naming tree could be used, for example, to in creating the content originator field 190 of FIG. 18.

Detailed illustrations of a scheme for recognizing and authenticating transmission payloads for preferred transport in accordance with the present invention have been provided for the edification of those of ordinary skill in the art, and not as a limitation of the scope of the invention. Numerous variations and modifications within the spirit of the present invention will of course occur to those of ordinary skill in the art in view of the embodiments that have been disclosed. For example, while in the described embodiments, the present invention is implemented primarily for the benefit of a broadband Internet access provider, the present invention may also be effectively implemented for any facility providing access to a multimode digital communications network that can take advantage of the preferred transport implementation schemes of the present invention. Note that preferred transport can be a simplistic as allowing or denying access to content, content class and a robust as providing the distribution of certain content with exclusion of usage fees or byte cap restrictions. Preferred transport is not limited to bandwidth or broadband access but to any consumption of content by nodes, devices, subscribers, and any apparatus capable of digital (and/or analog) transmissions. The scope of the inventions should, therefore, be determined not with reference to the above description, but should instead be determined with reference to the appended claims, along with the full scope of equivalents to which such claims are entitled.

I claim:

1. A method of offering preferred transport in a network, the method comprising:
   receiving a first part of a content transmission from a content provider in the network at a transmission device that transmits the content between the content provider and a destination of the content;
   receiving an indication of predetermined transport parameters in the network at the transmission device, the indication being contained in the received first part of the content transmission and the indication specifying an increased transmission speed for at least a duration of the content transmission;
   setting up and storing entries in a switching table identifying the content transmission based on the content provider and the destination, the entries in the switching table storing the predetermined transport parameters specified by the indication;
   receiving a second part of the content transmission in the network from the content provider;
   accessing the switching table to determine the predetermined transport parameters for the content transmission; and
   the transmission device transmitting the second part of the content transmission in the network in accordance with the predetermined transport parameters, accessed from the switching table, to the destination.

2. The method according to claim 1, wherein the first part of the content transmission is a command for a particular content transmission.

3. The method according to claim 2, wherein the command is a request command for a particular content transmission.

4. The method according to claim 3, wherein the command is an HTTP GET request command.

5. The method according to claim 4, wherein the command includes the indication of said predetermined transport parameters, and wherein the indication of said predetermined transport parameters includes a content tag.

6. The method according to claim 4, wherein the command includes information that is utilized in a return path for the content transmission.

7. The method according to claim 4, further comprising:
   receiving a response to the command, wherein the response includes a content tag.

8. The method according to claim 1, further comprising:
   authenticating a distribution allowed for the content transmission, and
   the data transmitting device authorizing only the allowed distribution of the content transmission.

9. The method according to claim 1, wherein the predetermined transport parameters include a preferred level of transport.

10. The method according to claim 9, wherein the predetermined transport parameters include a predetermined quality of service.

11. The method according to claim 9, wherein the predetermined transport parameters includes a predetermined transmission attribute.

12. The method according to claim 9, wherein the predetermined transport parameters includes a predetermined amount of packet loss.

13. The method according to claim 9, wherein the predetermined transport parameters includes a predetermined amount of jitter.

14. The method according to claim 1, further comprising:
   decrypting the indication of the predetermined transport parameters.

15. The method according to claim 1, wherein receiving a first part of the content transmission in the network includes receiving the first part of the content transmission in a node of the network along a transmission path of the content transmission.

16. The method according to claim 1, wherein the content transmission includes application data.

17. The method according to claim 1, wherein the indication of predetermined transport parameters is contained in a content payload header of the content transmission.

18. The method according to claim 1, further comprising an authentication element receiving a request for authentication of the content transmission through a communications port from the transmission device.

19. The method according to claim 18, wherein the authentication element and the content provider both store a shared authentication key that is used to validate the request by the authentication element.

20. The method according to claim 19, further comprising the authentication element determining if the communications port is registered.

21. The method according to claim 20, further comprising the authentication element determining if a signature, which is associated with the content transmission by the content provider, is encrypted, and wherein the authentication element decrypts the signature with the shared authentication key if the signature is encrypted.

22. The method according to claim 21, further comprising the authentication element determining if the signature is valid and retrieving a transport profile from a database if the signature is valid.

23. A data transmission device comprising:
a data receiving device configured to receive a first part of a content transmission and an indication of predetermined transport parameters contained in the received first part of the content transmission in a network from a content provider, a service logic device for grouping the first part of the content transmission and subsequent parts of the content transmission as a communications flow, the indication specifying an increased transmission speed for at least a duration of the content transmission;
a transmission logic device for determining transmission parameters of the content transmission according to the indication of the predetermined transport parameters;
a storage device for creating and storing entries in a switching table identifying the content transmission based on the content provider and a destination, the entries in the switching table storing the predetermined transport parameters;
a maintenance component device for managing and deleting entries in the switching table that are no longer needed;
a switching apparatus for transporting the first part and subsequent parts of the content transmission in the network to a communications port of the destination of the content transmission according to the communications flow determined by the service logic device by reference to the entries in the switching table; and
a data transmitting device configured to transmit the subsequent parts of the content transmission in the network to the destination in conjunction with the communications port in accordance with the predetermined transport parameters specified by the switching table.

24. The data transmission device according to claim 23, wherein the first part of the content transmission is a command for a particular content transmission.

25. The data transmission device according to claim 24, wherein the command is a request command for a particular content transmission.

26. The data transmission device according to claim 25, wherein the command is an HTTP GET request command.

27. The data transmission device according to claim 26, wherein the command includes the indication of predetermined transport parameters, and wherein the indication of predetermined transport parameters includes a content tag.

28. The data transmission device according to claim 26, wherein the command identifies a return path for the content transmission.

29. The data transmission device according to claim 26, wherein the data receiving device is further configured to receive a response to the command, wherein the response includes a content tag.

30. The data transmission device according to claim 23, wherein the predetermined transport parameters include a preferred level of transport.

31. The data transmission device according to claim 30, wherein the predetermined transport parameters includes a predetermined quality of service.

32. The method according to claim 31, wherein the predetermined transport parameters includes a predetermined transmission attribute.

33. The method according to claim 31, wherein the predetermined transport parameters includes a predetermined amount of packet loss.

34. The method according to claim 31, wherein the predetermined transport parameters includes a predetermined amount of jitter.

35. The data transmission device according to claim 23, further comprising:
a decryption element configured to decrypt the indication of the predetermined transport parameters.

36. The data transmission device according to claim 23, further comprising:
an authentication element configured to authenticate a distribution allowed for the content transmission; and
an authorization element configured to authorize only allowed distribution of the content transmission.

37. The data transmission device according to claim 23, wherein the indication of predetermined transport parameters is contained in a content payload header of the content transmission.

38. The data transmission device according to claim 23, further comprising an authentication element that receives a request for authentication of the content transmission through a communications port, wherein the authentication element and the content provider both store a shared authentication key and the authentication element determines if a signature, which is associated with the content transmission, is encrypted, and wherein the authentication element decrypts the signature with the shared authentication key if the signature is encrypted.

39. The data transmission device according to claim 38, wherein the authentication element determines if the signature is valid and retrieves a transport profile from a database if the signature is valid.

40. A method of offering preferred transport in a network including an Internet, the method comprising:
in a preferred transporter device linked between a content originator located on the Internet for providing a content transmission, and a destination defined as a client computer for receiving the content transmission, wherein said preferred transporter device is linked to both the client computer and a router further connected to the Internet, receiving a first part of the content transmission from the content originator;

receiving an indication of predetermined transport parameters, the indication being contained in the received first part of the content transmission and the indication specifying an increased transmission speed for at least a duration of the content transmission;

setting up and storing entries in a switching table identifying the content transmission based on the content originator and the destination, the entries in the switching table storing the predetermined transport parameters specified by the indication;

receiving a second part of the content transmission from the content originator;

accessing the switching table to determine the predetermined transport parameters for the content transmission; and transmitting the second part of the content transmission in accordance with the predetermined transport parameters, accessed from the switching table, to the destination, wherein operation of said preferred transporter device allows the content originator to maintain control over the first and second parts of the content transmission throughout the network.

41. The method of claim 40 wherein said content originator is located on a peer-to-peer content distribution network available on the Internet.

* * * * *